United States Patent
Yanagihashi et al.

(10) Patent No.: US 11,652,700 B2
(45) Date of Patent: May 16, 2023

(54) STATE DIAGNOSIS APPARATUS AND SYSTEM

(71) Applicant: KABUSHIKI KAISHA TOSHIBA, Tokyo (JP)

(72) Inventors: Hiroyuki Yanagihashi, Kawasaki Kanagawa (JP); Takashi Sudo, Tokyo (JP); Yasuhiro Kanishima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/446,604

(22) Filed: Aug. 31, 2021

(65) Prior Publication Data

US 2022/0239563 A1 Jul. 28, 2022

(30) Foreign Application Priority Data

Jan. 28, 2021 (JP) .............................. JP2021-012236

(51) Int. Cl.
    *H04L 29/08* (2006.01)
    *H04L 41/14* (2022.01)
    *H04L 41/16* (2022.01)
    *H04L 43/50* (2022.01)
    *G16Y 40/20* (2020.01)

(52) U.S. Cl.
    CPC ............ *H04L 41/145* (2013.01); *H04L 41/16* (2013.01); *H04L 43/50* (2013.01); *G16Y 40/20* (2020.01)

(58) Field of Classification Search
    CPC ...... H04L 41/5048; H04L 41/16; H04L 43/50
    See application file for complete search history.

(56) References Cited

U.S. PATENT DOCUMENTS

| | | | |
|---|---|---|---|
| 2019/0109599 A1* | 4/2019 | Matsuzawa | H03M 1/123 |
| 2021/0010909 A1 | 1/2021 | Yanagihashi et al. | |
| 2021/0265845 A1* | 8/2021 | Kanai | H02J 7/0016 |

FOREIGN PATENT DOCUMENTS

| | | |
|---|---|---|
| JP | WO2019/146315 A1 | 8/2019 |
| JP | 2021-15405 A | 2/2021 |

* cited by examiner

*Primary Examiner* — Adnan M Mirza
(74) *Attorney, Agent, or Firm* — Finnegan, Henderson, Farabow, Garrett & Dunner, LLP

(57) ABSTRACT

According to one embodiment, a state diagnosis apparatus includes a processing circuit. The processing circuit executes a model receiving, as an input, first data relating to a state of a device at each of a plurality of stages along a time series and outputting a first numerical value quantitatively indicating the first data for each of the stages. The processing circuit determines whether or not first numerical values output from the model monotonously change along the time series.

13 Claims, 17 Drawing Sheets

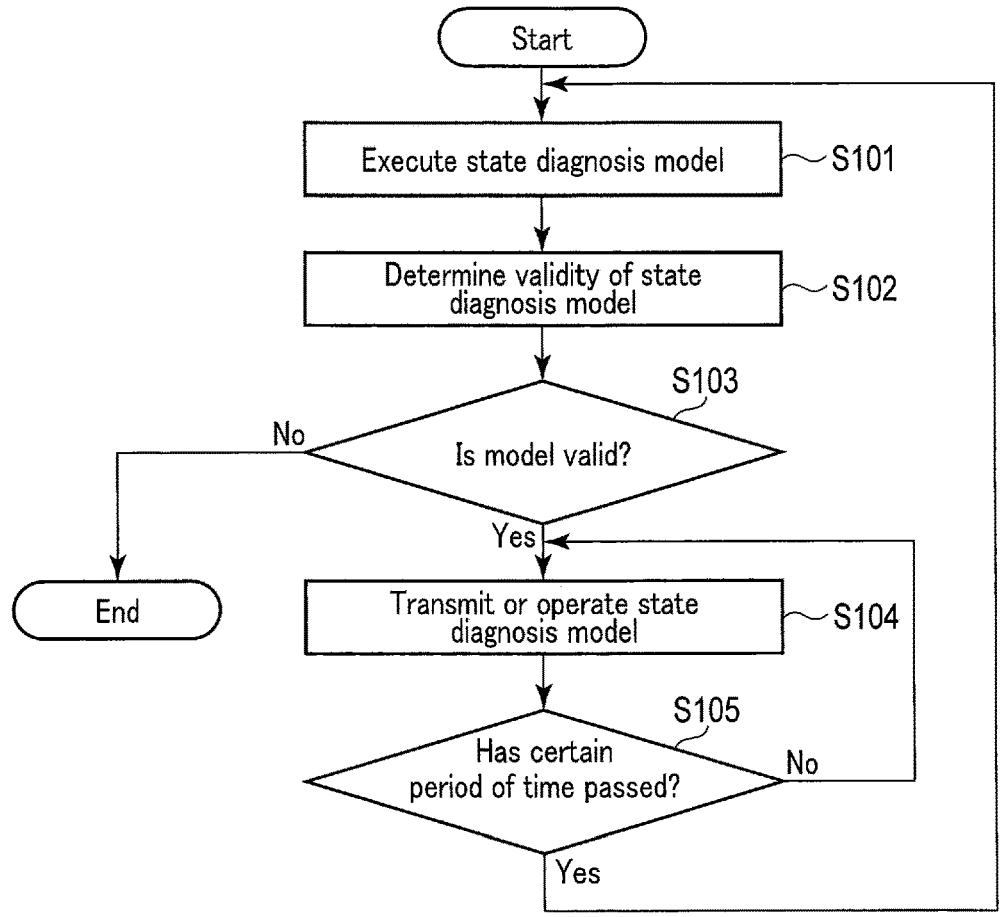
F I G. 4
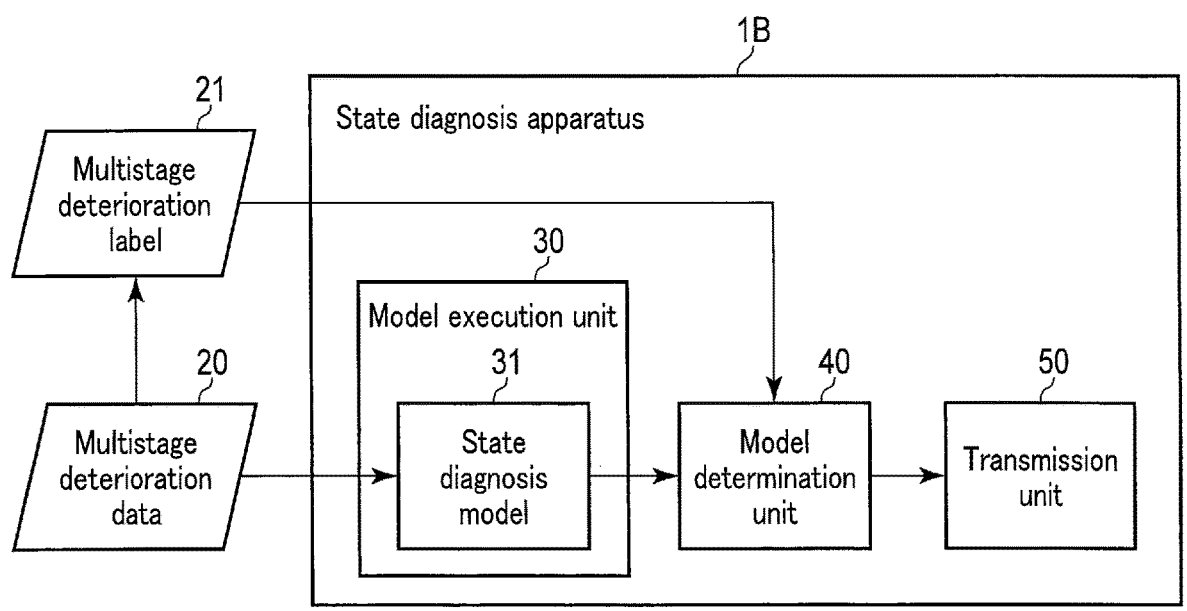
F I G. 5

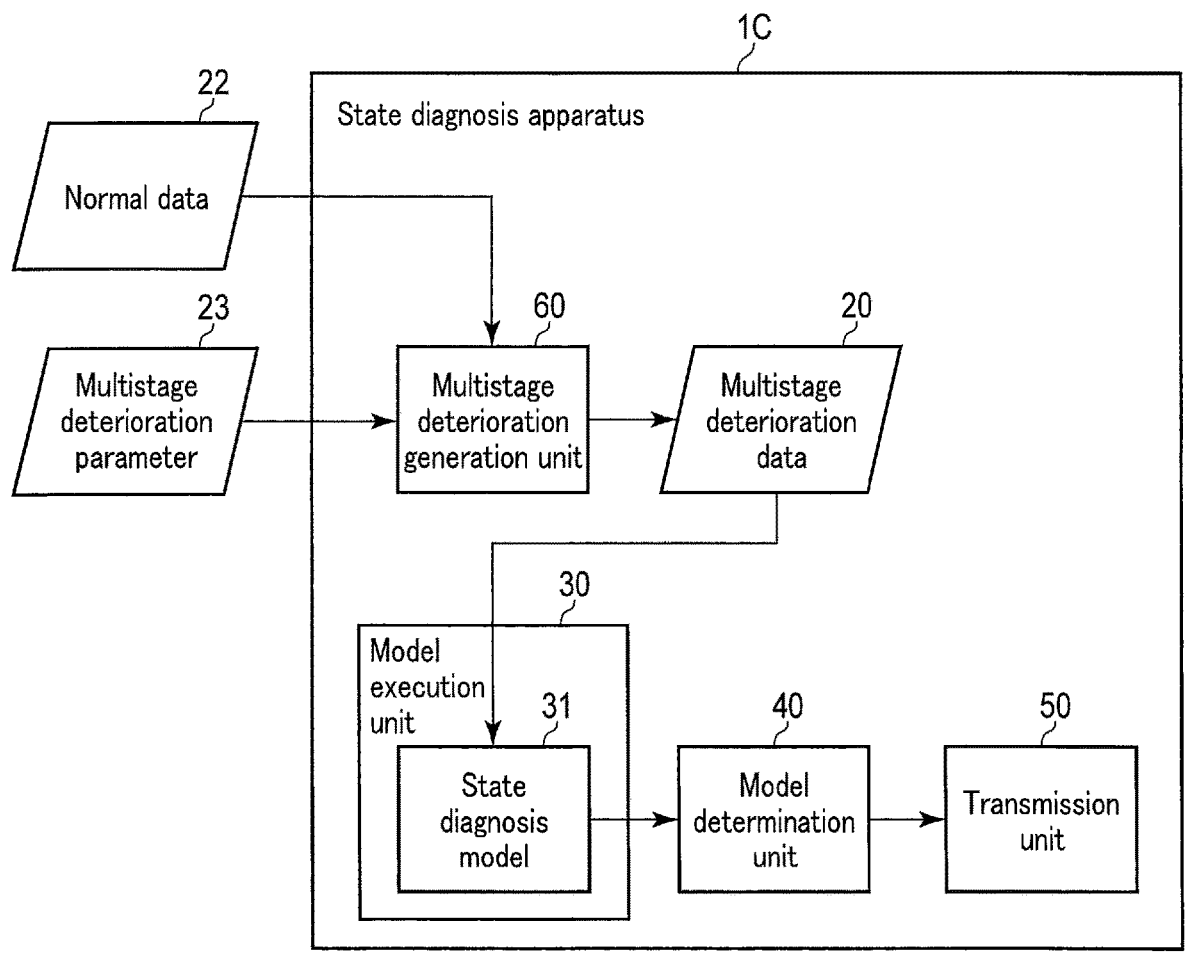
F I G. 9

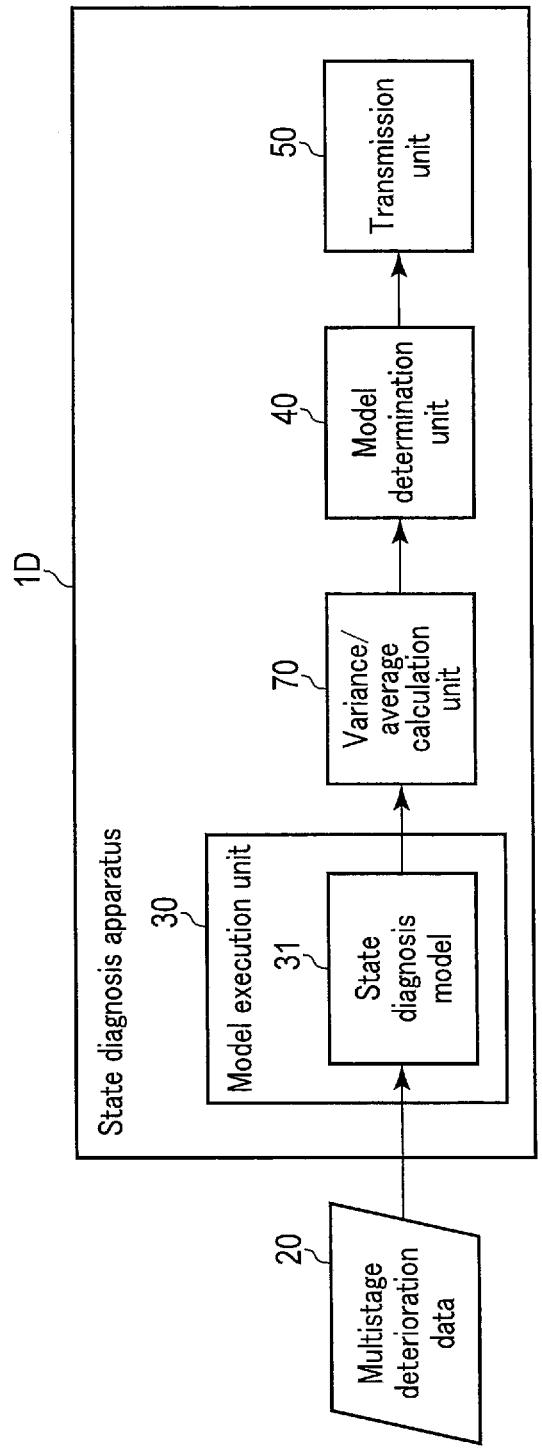
F I G. 12

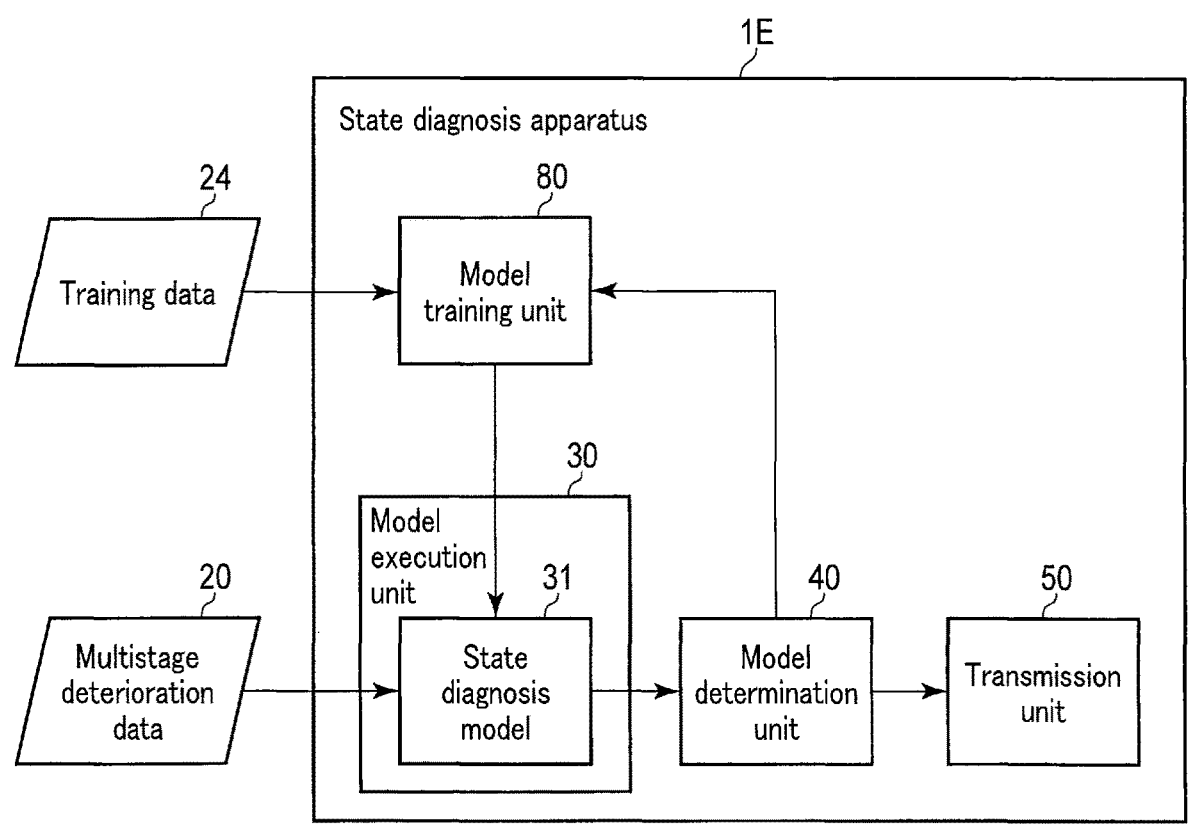
F I G. 15

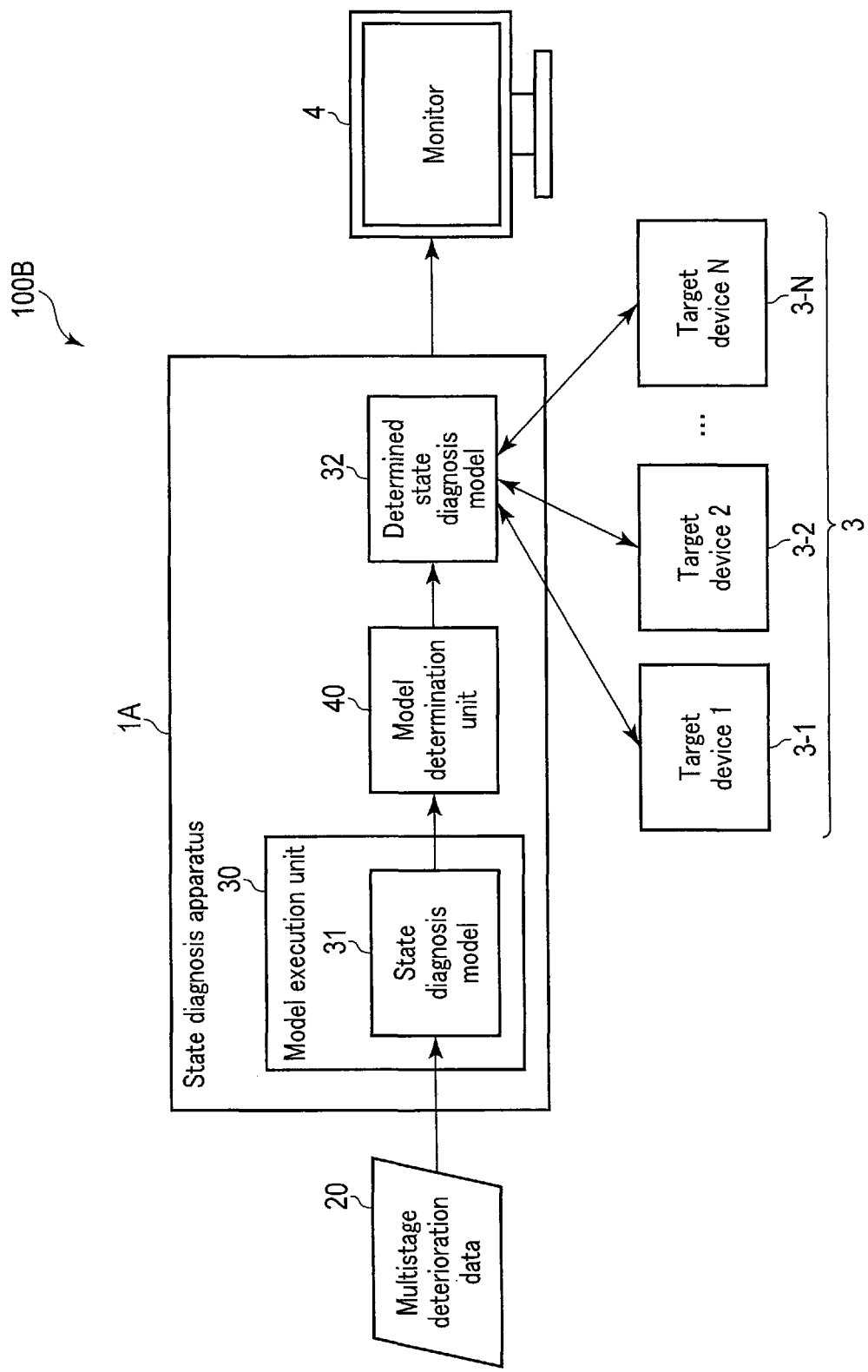
F I G. 19

ND SYSTEM

CROSS-REFERENCE TO RELATED APPLICATION

This application is based upon and claims the benefit of priority from Japanese Patent Application No. 2021-012236, filed Jan. 28, 2021, the entire contents of which are incorporated herein by reference.

FIELD

Embodiments described herein relate generally to a state diagnosis apparatus and a system.

BACKGROUND

Generally, in industrial devices and/or infrastructure facilities, periodic inspection is executed by engineers or the like to maintain the safety thereof. However, with recent development of IoT (Internet of Things) techniques, manual state diagnosis of a device as described above is expected to be replaced by state diagnosis of a device with a server using sensors or the like. In the system executing state diagnosis of a device like the latter, a model trained by a machine learning technique is used to diagnose abnormality and/or deterioration of the device from the measurement values of the sensors. In this operation, it is important to determine whether or not the trained model is capable of sensing abnormality and/or deterioration of the device as intended, that is, validity of the model.

BRIEF DESCRIPTION OF THE DRAWING

FIG. 4 is a diagram illustrating an operation example of the state diagnosis apparatus according to the first embodiment.

FIG. 5 is a diagram illustrating a configuration example of a state diagnosis apparatus according to a second embodiment.

FIG. 9 is a diagram illustrating a configuration example of a state diagnosis apparatus according to a third embodiment.

FIG. 12 is a diagram illustrating a configuration example of a state diagnosis apparatus according to a fourth embodiment.

FIG. 15 is a diagram illustrating a configuration example of a state diagnosis apparatus according to a fifth embodiment.

FIG. 19 is a diagram illustrating a configuration example of a state diagnosis system according to a seventh embodiment.

DETAILED DESCRIPTION

Figure 1:
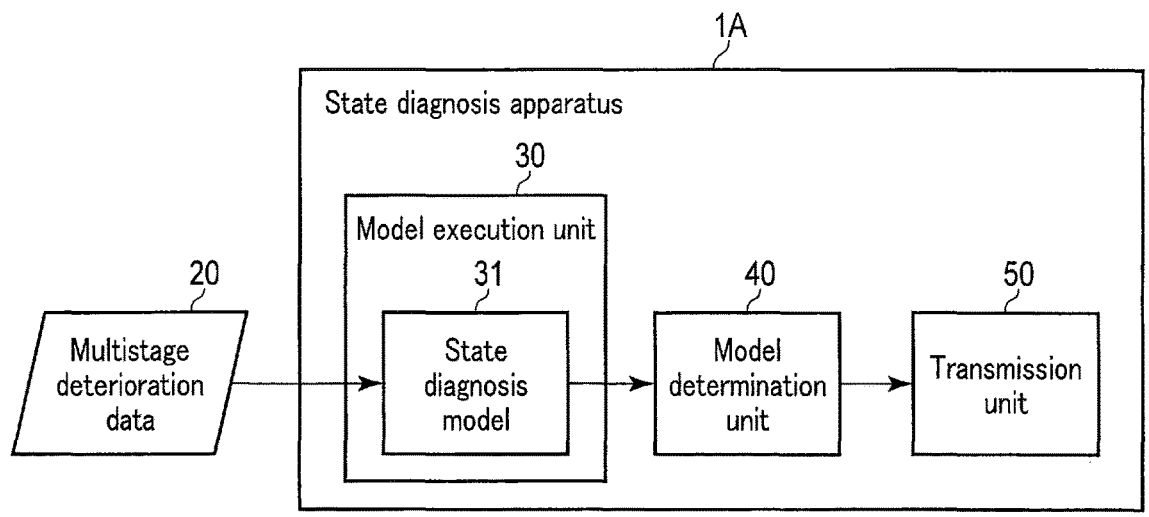
FIG. 1 is a diagram illustrating a configuration example of a state diagnosis apparatus according to a first embodiment.

In general, according to one embodiment, a state diagnosis apparatus includes a processing circuit. The processing circuit executes a model receiving, as an input, first data relating to a state of a device at each of a plurality of stages along a time series and outputting a first numerical value quantitatively indicating the first data for each of the stages. The processing circuit determines whether or not first numerical values output from the model monotonously change along the time series.

A state diagnosis apparatus and a system according to embodiments will now be described hereinafter with reference to drawings. In the following embodiments, constituent elements denoted by the same reference numerals execute the same operations, and an overlapping explanation thereof will be omitted.

At least one object of the state diagnosis apparatus and the system according to the following embodiments is to determine validity of a model to sense a deterioration state and/or a deterioration sign of the industrial device (hereinafter referred to as "device") on the basis of a signal of sound from the device. Generally, when deterioration of the device progresses, the signal of sound generated with the device gradually changes. The model outputs a sensing result relating to the deterioration state and/or the deterioration sign of the device by sensing change of the signal of sound generated with the device. By notifying the user (for example, the engineer) of the sensing result, the engineer is enabled to replace or maintain the device before deterioration of the device progresses and the device malfunctions. From the viewpoint described above, it can be said that the model contributes to preventive maintenance of the device. The following embodiments determine validity of the model capturing and sensing change of the signal caused by deterioration of the device as described above.

First Embodiment

FIG. 1 is a diagram illustrating a configuration example of a state diagnosis apparatus 1A according to the first embodiment.

The state diagnosis apparatus 1A is an apparatus having a function of determining validity of a model diagnosing a state of a device. The state diagnosis apparatus 1A is implemented with a processing device of various types, such as a personal computer, a server computer, and an edge device. The state diagnosis apparatus 1A includes a model execution unit 30, a state diagnosis model 31, a model determination unit 40, and a transmission unit 50.

A multistage deterioration data 20 is signal data relating to deterioration states of the device at respective stages along time series. Generally, deterioration of the device progresses due to continuous or intermittent use for a long time, and the performance of the device deteriorates thereby. With the deterioration, various deterioration signs appear, such as abnormal sound or vibration occurring in the device and deterioration in quality of data output from the device. Because the deterioration signs indicate the deterioration state of the device, it can be said that the multistage deterioration data 20 is signal data relating to the deterioration signs of the device at respective stages along the time series.

In the present embodiment, the multistage deterioration data 20 is supposed to be signal data relating to sound indicating the deterioration states of the device at the respective stages along the time series, but is not limited thereto. The multistage deterioration data 20 may be, for example, one-dimensional signal data relating to acceleration and/or vibration of the device, or two-dimensional signal data relating to the image and/or moving images output from the device. Specifically, the multistage deterioration data 20 may be any signal data acquired from a plurality of different deterioration states of the device.

As a matter of course, multistage signal data relating to various state changes of the device accompanying a lapse of time, not limited to deterioration, may be used instead of the multistage deterioration data 20. As another example, the multistage deterioration data 20 may be signal data acquired at regular or irregular time intervals. Specifically, the multistage deterioration data 20 may be signal data relating to the state of the device and acquired at a plurality of successive points in time in the time series (also referred to as "time axis" or "timeline").

The multistage deterioration data 20 may be signal data (also referred to as "sensor data") acquired from a sensor installed in the device. As another example, the multistage deterioration data 20 may be signal data acquired from the device, deterioration of which has actually been recognized, or signal data acquired from the device in which any change of the state may have occurred because a certain period of time has passed from the initial state (normal state), although deterioration thereof has not actually been recognized. As another example, the multistage deterioration data 20 may be actual data actually acquired from the device, or pseudo data spuriously generated by simulating the deterioration tendency of the device.

The model execution unit 30 acquires the multistage deterioration data 20, and executes a state diagnosis model 31.

The state diagnosis model 31 is a model outputting numerical values (hereinafter referred to as "state numerical values") quantitatively indicating the state of the device from the input data. For example, when the input data is the multistage deterioration data 20, the state diagnosis model 31 outputs state numerical values quantitatively indicating the deterioration states of the device at the respective stages along the time series. It can be said that the state numerical values are deterioration degrees indicating degrees of deterioration of the device. Generally, because the deterioration degree is expected to increase as deterioration of the device progresses, it can be said that the state diagnosis model 31 diagnoses the degree of deterioration of the device accompanying a lapse of time. The state diagnosis model 31 may be a model acquired from the outside of the state diagnosis apparatus 1A, or a model generated inside the state diagnosis apparatus 1A. Specifically, the state diagnosis model 31 may be included in the state diagnosis apparatus 1A, or is not necessarily included in the state diagnosis apparatus 1A.

In the present embodiment, the state diagnosis model 31 is supposed to receive, as an input, signal data relating to sound indicating the deterioration states of the device at the respective stages along the time series and output state numerical values quantitatively indicating the signal data, but the structure is not limited thereto. The state diagnosis model 31 may receive, as an input, signal data relating to various state changes of the device accompanying a lapse of time, not limited to deterioration, and output state numerical values corresponding to the signal data.

The state diagnosis model 31 may output a state numerical value (one-to-one correspondence) for a stage of the device, or output a plurality of state numerical values (one-to-many correspondence) for a stage of the device. Specifically, the state diagnosis model 31 may output one or more state numerical values for a stage of the device. In other words, the state diagnosis model 31 may output a feature vector including n (n is a natural number) state numerical values for a stage of the device. The state numerical values may be continuous values or discrete values.

The state diagnosis model 31 is acquired by training a machine learning model, for example, by converting the input data into state numerical values. The state diagnosis model 31 may be implemented with a algorithm directly converting the input signal data into state numerical values, or a plurality of algorithms converting the input signal data into state numerical values in the end through a plurality of steps. For example, when the input data is signal data relating to sound of the device, the state diagnosis model 31 may be implemented with an algorithm subjecting sound data to frequency conversion (Fourier transform) to generate frequency data, and an algorithm receiving the converted frequency data as an input and outputting a feature quantity of the sound data as a state numerical value. Various models (such as linear regression, logistic regression, support vector machine, decision tree, random forest, and neural network) outputting state numerical values from input data are applicable as the machine learning model. In the present embodiment, suppose that the state diagnosis model 31 is a neural network.

The model determination unit 40 determines whether or not the state diagnosis model 31 is capable of properly sensing the deterioration state of the device at each of stages along the time series. Specifically, the model determination unit 40 determines whether or not the state numerical values output from the state diagnosis model 31 for the multistage deterioration data 20 monotonously change as the stage of deterioration of the device progresses. As described above, because the deterioration degree of the device is expected to increase as deterioration of the device progresses, it can be said that the model determination unit 40 determines whether or not the state numerical values indicating the deterioration degree of the device monotonously increase as the stage of deterioration of the device progresses.

For example, when the state numerical value and the deterioration degree of the device have positive correlation, for example, when the deterioration degree of the device increases as the state numerical value increases, the model determination unit 40 determines whether or not the state numerical value increases as the stage of deterioration of the device progresses. By contrast, when the state numerical value and the deterioration degree of the device have negative correlation, for example, when the deterioration degree of the device decreases as the state numerical value increases, the model determination unit 40 determines whether or not the state numerical value decreases as the stage of deterioration of the device progresses. Specifically, according to the definition of the state numerical value, the model determination unit 40 determines whether or not the state numerical values indicating the deterioration degree of the device accompanying a lapse of time monotonously increase or decrease. Monotonicity of the state numerical value is checked by, for example, comparing the state numerical value at a predetermined stage with state numerical values at stages before and after the predetermined stage. It can be said that the model determination unit 40 checks whether or not the state diagnosis model 31 is capable of properly sensing deterioration of the device, that is, checking the performance of the state diagnostic model 31.

Figure 2:
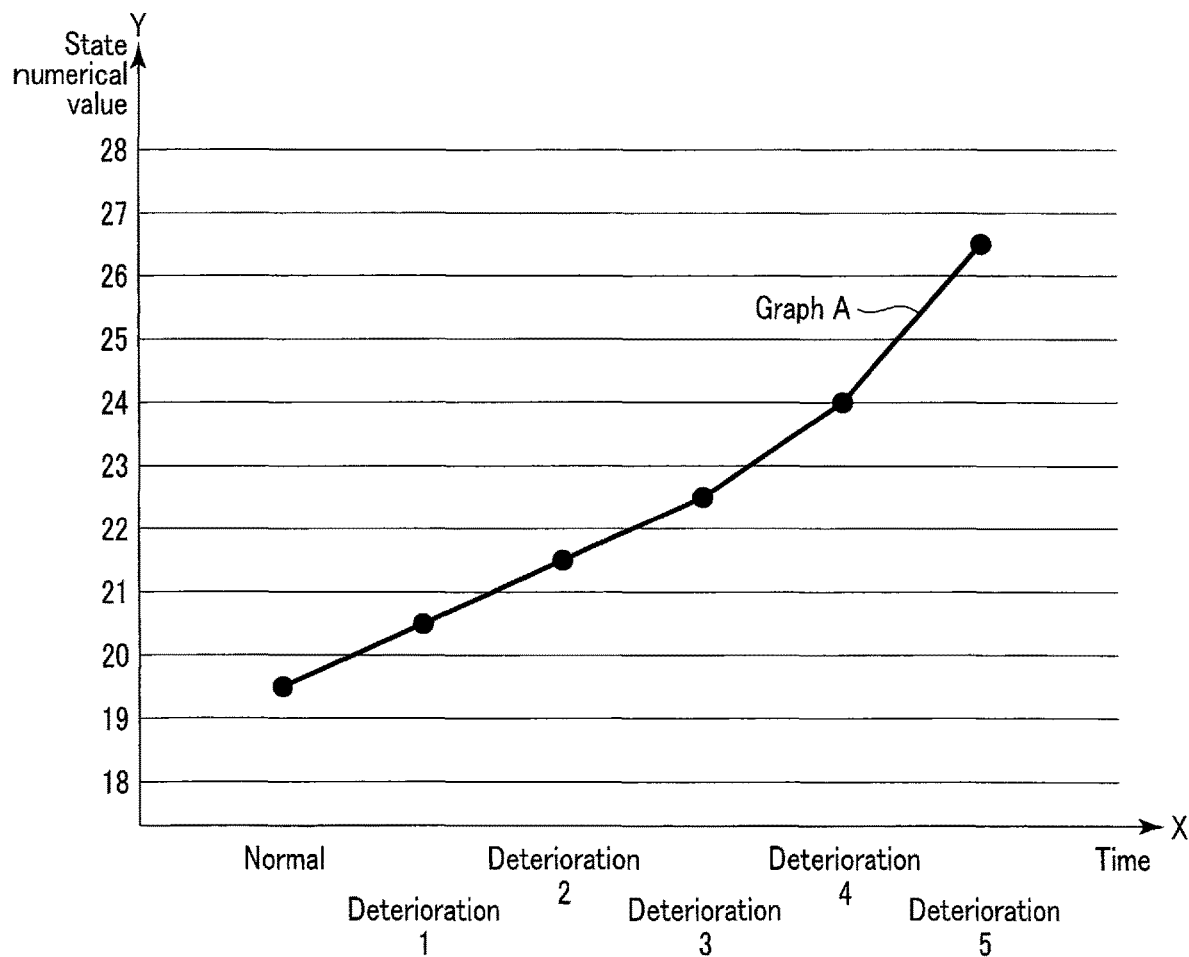
FIG. 2 is a diagram illustrating an example of relation between progress of deterioration of the device and state numerical values.
Figure 3:
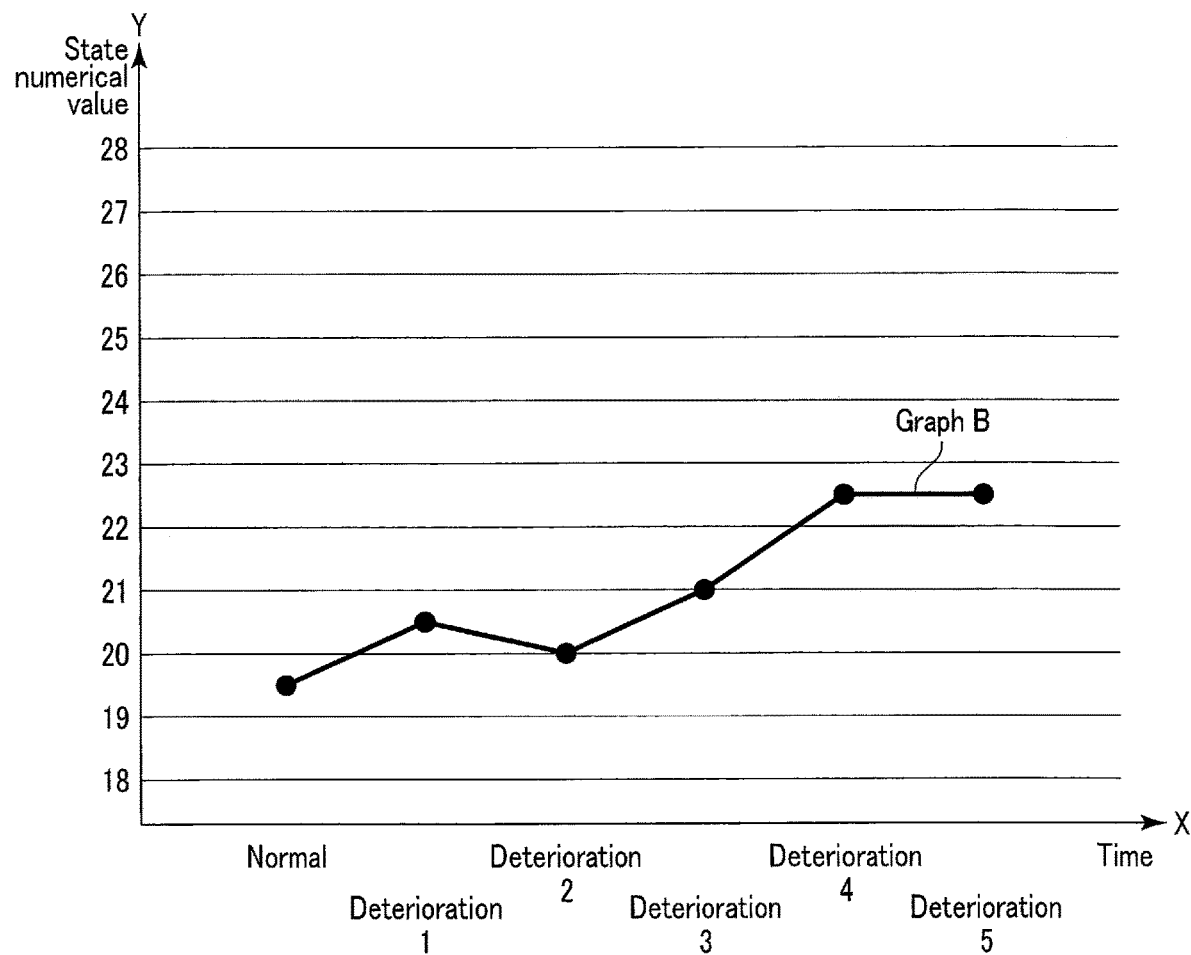
FIG. 3 is a diagram illustrating an example of relation between progress of deterioration of the device and state numerical values.

FIG. 2 and FIG. 3 are diagrams illustrating examples of relation between progress of deterioration of the device and the state numerical values.

FIG. 2 and FIG. 3 illustrate changes of the state numerical values indicating the deterioration states at respective stages of the device. Specifically, on a two-dimensional plane (XY plane) in which the horizontal axis (X axis) indicates the time and the vertical axis (Y axis) indicates the state numerical value, the change of the state numerical value is expressed with "graph A" and "graph B". The graphs express the state numerical value at the stage (Normal) at which the device normally operates and the state numerical values at stages (Deterioration 1 to Deterioration 5) through which deterioration of the device progresses. In this example, suppose that one state numerical value is assigned to each of stages (Normal to Deterioration 5) of the device (one-to-one correspondence), and suppose that the state numerical value and the deterioration degree of the device have positive correlation, that is, the deterioration degree of the device increases as the state numerical value increases.

The graph A in FIG. 2 illustrates an example in which the state numerical values monotonously increase according to the deterioration stages. Specifically, the graph A illustrates that the state numerical values indicating the deterioration degree of the device monotonously increase as deterioration of the device progresses. When the model determination unit 40 determines that the state numerical values output from the state diagnosis model 31 for the multistage deterioration data 20 monotonously increase as in the graph A, the model determination unit 40 determines that the state diagnosis model 31 is valid.

For example, the model determination unit 40 determines monotonicity of the graph A expressing the change of the state numerical value as follows. First, the model determination unit 40 regards the state numerical value at the predetermined stage in the stages (Normal to Deterioration 5) of the graph A as A, regards the state numerical value at the stage before the predetermined stage as B, and regards the state numerical value at the stage after the predetermined stage as C. The model determination unit 40 determines whether or not the state numerical values monotonously increase in the graph A by determining whether or not the relation "B<A<C" is established in the stages of the graph A. In the same manner, the model determination unit 40 determines whether or not the state numerical values monotonously decrease in the graph A by determining whether or not the relation "B>A>C" is established in the stages of the graph A. As described above, the model determination unit 40 determines monotonicity of the graph A by comparing the state numerical value at the predetermined stage with state numerical values at stages before and after the predetermined stage.

As a matter of course, in determination of monotonous increase, the model determination unit 40 may determine whether or not any one of "B<A" and "A<C" is established in the stages of the graph A. In the same manner, in determination of monotonous decrease, the model determination unit 40 may determine whether or not any one of "B>A" and "A>C" is established in the stages of the graph A. Specifically, it suffices that the model determination unit 40 determine the sign of a difference between the state numerical value at the predetermined stage and the state numerical value of one of the stages before and after the predetermined stage. The model determination unit 40 may determine that the state numerical values monotonously increase or monotonously decrease, also when the difference is 0.

The graph B in FIG. 3 illustrates an example in which the state numerical values do not monotonously increase according to the deterioration stages. Specifically, FIG. 3 illustrates that the state numerical value decreases from the deterioration stage 1 (Deterioration 1) to the next deterioration stage 2 (Deterioration 2), and thereafter the state numerical value increases to the following deterioration stage 3 (Deterioration 3). When the model determination unit 40 determines that the state numerical values output from the state diagnosis model 31 for the multistage deterioration data 20 do not monotonously increase as in the graph B, the model determination unit 40 determines that the state diagnosis model 31 is not valid.

As described above, the model determination unit 40 determines validity of the state diagnosis model 31. FIG. 2 and FIG. 3 are diagrams to aid visual understanding of change of the state numerical value output from the state diagnosis model 31. Actually, the change of the state numerical value output from the state diagnosis model 31 is calculated with a processing circuit 11 (illustrated later in FIG. 17) included in the state diagnosis apparatus 1A. Specifically, change of the state numerical value is not necessarily displayed as in FIG. 2 and FIG. 3, but it suffices that the change is calculated inside the state diagnosis apparatus 1A. It can be said that the state diagnosis model 31 determined as a valid model is a model suitable for diagnosing deterioration of the device.

The transmission unit 50 transmits the state diagnosis model 31 determined with the model determination unit 40 as a valid model. The transmission unit 50 transmits the state diagnosis model 31 to, for example, an external device (such as a personal computer, a server computer, and an edge device) having a structure capable of executing the state diagnosis model 31. The external device executes state diagnosis of the device using the received state diagnosis model 31. When the state diagnosis apparatus 1A executes the state diagnosis model 31 determined as a valid model, the transmission unit 50 does not necessarily transmit the state diagnosis model 31 to the external device. In this case, the state diagnosis apparatus 1A may execute the state diagnosis model 31 having not been determined as a valid model, and execute the state diagnosis model 31 have been determined as a valid model.

The transmission unit 50 may transmit the state numerical value output from the state diagnosis model 31 for the multistage deterioration data 20. The transmission unit 50 transmits the state numerical value to, for example, an external device (such as a monitor) having a structure capable of displaying the state numerical value. The external device displays the received state numerical value. When the state diagnosis apparatus 1A has a structure capable of displaying the state numerical value, the transmission unit 50 is not necessarily transmit the state numerical value to the external device. In this case, the state diagnosis apparatus 1A may display the state numerical value. As another example, the state numerical values may be displayed in a graph as illustrated in FIG. 2 and FIG. 3, in the external device or the state diagnosis apparatus 1A.

FIG. 4 is a diagram illustrating an operation example of the state diagnosis apparatus 1A according to the first embodiment.

At Step S101, the state diagnosis apparatus 1A executes the state diagnosis model 31. Specifically, the model execution unit 30 of the state diagnosis apparatus 1A executes the state diagnosis model 31, and thereby causes the state diagnosis model 31 to output state numerical values corresponding to the multistage deterioration data 20.

At Step S102, the state diagnosis apparatus 1A determines validity of the state diagnosis model 31. Specifically, the model determination unit 40 of the state diagnosis apparatus 1A determines whether or not the state numerical values output from the state diagnosis model 31 monotonously change.

At Step S103, the state diagnosis apparatus 1A selects processing to be executed subsequently, in accordance with whether or not the state diagnosis model 31 is valid. Specifically, when it is determined that the state diagnosis model 31 is valid (Yes at Step S103), the state diagnosis apparatus 1A executes Step S104. By contrast, when it is determined that the state diagnosis model 31 is not valid (No at Step S103), the state diagnosis apparatus 1A ends the process.

At Step S104, the state diagnosis apparatus 1A transmits or operates the state diagnosis model 31. Specifically, the transmission unit 50 of the state diagnosis apparatus 1A transmits the state diagnosis model 31 determined as a valid model to the external device. The transmitted state diagnosis model 31 is operated in the external device. As another example, the model execution unit 30 of the state diagnosis apparatus 1A operates the state diagnosis model 31 by executing the state diagnosis model 31 determined as a valid model.

At Step S105, the state diagnosis apparatus 1A selects processing to be executed subsequently, in accordance with whether or not a certain period of time has passed after operation of the state diagnosis model 31 was started. Specifically, when a certain period of time has passed (Yes at Step S105), the state diagnosis apparatus 1A returns to Step S101, executes the state diagnosis model 31 again, and thereafter determines validity of the state diagnosis model 31. By contrast, when a certain period of time has not passed (No at Step S105), the state diagnosis apparatus 1A returns to Step S104, and continues operation of the state diagnosis model 31.

The reason why the state diagnosis apparatus 1A determines validity of the state diagnosis model 31 again after a certain period of time has passed is that it is predicted that the estimation accuracy deteriorates even in the state diagnosis model 31 once determined as a valid model, when deterioration occurring in the device in operation is smaller than, or different from, deterioration assumed with the state diagnosis model 31. It can be said that the state diagnosis apparatus 1A determines whether or not the estimation accuracy of the state diagnosis model 31 deteriorates by determining validity of the state diagnosis model 31 again after a certain period of time.

When the state diagnosis apparatus 1A determines validity of the state diagnosis model 31 again, the multistage deterioration data 20 used for determination of validity may be replaced. In this operation, the multistage deterioration data 20 used in the previous determination may be replaced by another multistage deterioration data 20 including more subdivided stages than those of the previous data.

The state diagnosis apparatus 1A according to the first embodiment described above is capable of determining validity of the model diagnosing the state of the device. In addition, the state diagnosis apparatus 1A transmits the model determined as a valid model to the external device. This structure enables the external device to execute state diagnosis of the device using the received model. The state diagnosis apparatus 1A is also capable of executing state diagnosis of the device using the model determined as a valid model. The state diagnosis apparatus 1A also transmits the state numerical value output from the model to the external device. This structure enables the external device to display the received state numerical value. The state diagnosis apparatus 1A is also capable of displaying the state numerical value output from the model.

Second Embodiment

FIG. 5 is a diagram illustrating a configuration example of a state diagnosis apparatus 1B according to a second embodiment.

The state diagnosis apparatus 1B according to the second embodiment compares change of the state numerical value output from a state diagnosis model 31 for multistage deterioration data 20 with change of signal data indicated with a multistage deterioration label 21, and determines validity of the state diagnosis model 31.

The multistage deterioration label 21 is a data label indicating the degrees of deterioration at respective stages corresponding to the multistage deterioration data 20. Specifically, the multistage deterioration label 21 indicates differences between signal data in the normal state of the device and signal data in the respective deterioration states of the device. The multistage deterioration label 21 is generated from the multistage deterioration data 20. For example, the multistage deterioration label 21 may be artificially generated on the basis of the multistage deterioration data 20, or mechanically generated with a machine learning model or the like calculating the difference from the multistage deterioration data 20.

Figure 6:
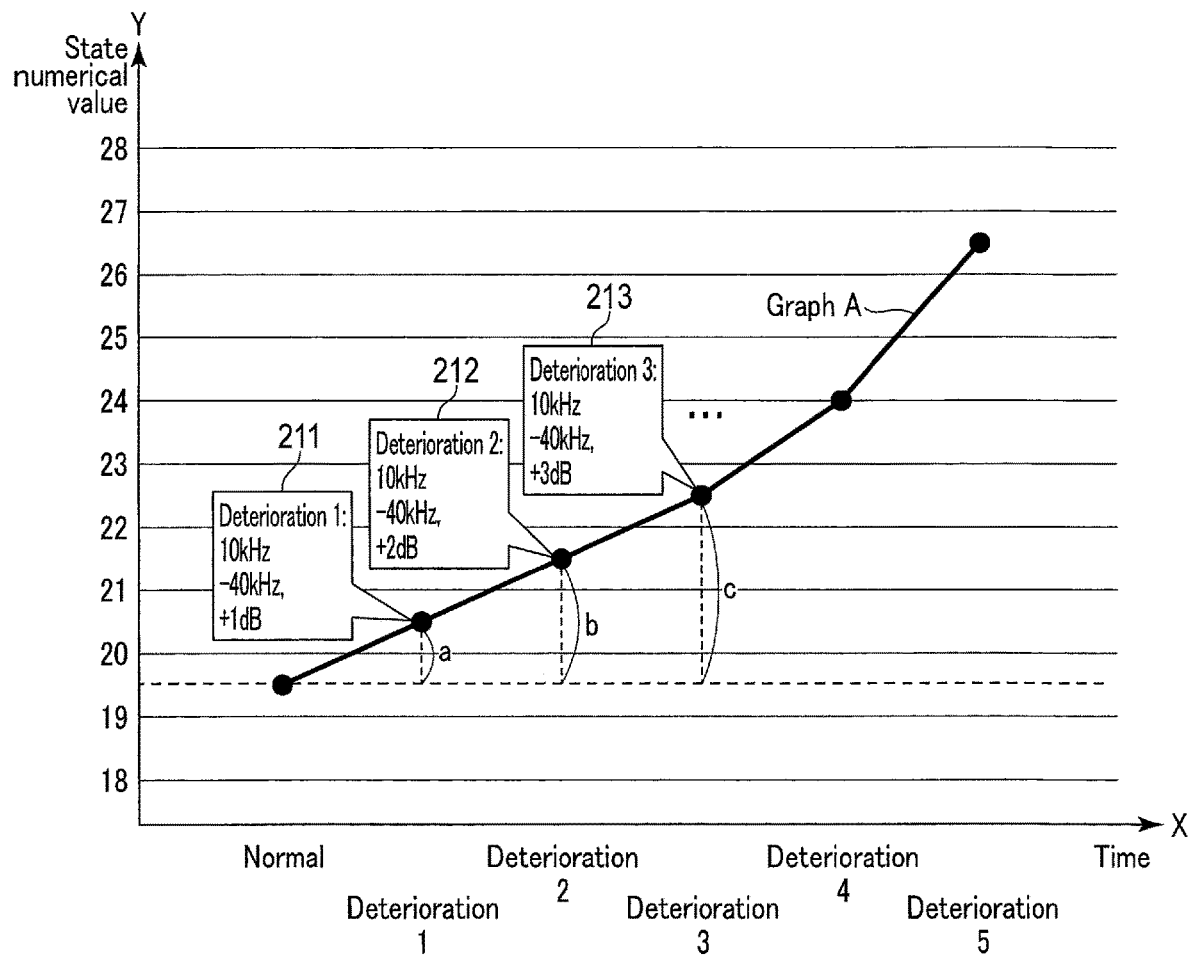
FIG. 6 is a diagram illustrating an example of relation between progress of deterioration of the device, state numerical values, and a multistage deterioration label.
Figure 7:
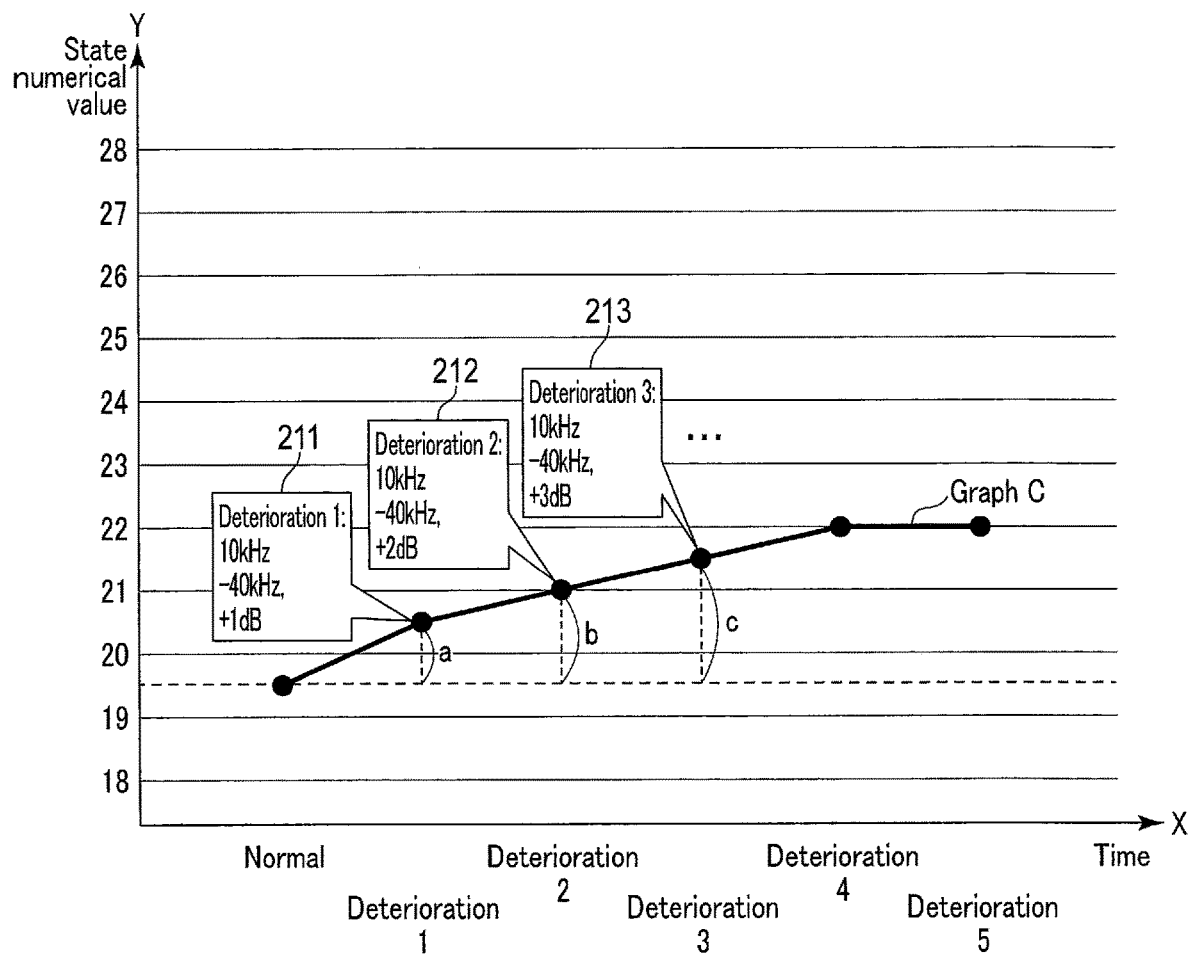
FIG. 7 is a diagram illustrating an example of relation between progress of deterioration of the device, state numerical values, and a multistage deterioration label.

FIG. 6 and FIG. 7 are diagrams illustrating examples of relation between progress of deterioration of the device, the state numerical values, and the multistage deterioration label 21.

In FIG. 6 and FIG. 7, differences between signal data at a stage (Normal) at which the device normally operates and signal data at deterioration stages (Deterioration 1 to Deterioration 5) are indicated by a plurality of labels 211, 212, 213, . . . . Specifically, the labels 211, 212, 213, . . . are illustrated in the form referring to data points through which the graph A illustrated in FIG. 6 and the graph C illustrated in FIG. 7 extend at the respective deterioration stages. The labels 211, 212, 213, . . . are included in the multistage deterioration label 21.

The graph A illustrated in FIG. 6 is the same as the graph A illustrated in FIG. 2. Each of the graph A and the graph C illustrates an example in which the state numerical values monotonously increase in accordance with the deterioration stages. However, the graph A and the graph C are mutually different in rate with which the state numerical values monotonously increase. Specifically, the graph A has a larger rate with which the state numerical values monotonously increase than those of the graph C. The graph A and the graph C illustrate the same state numerical values at "Normal" to "Deterioration 1", but the state numerical values illustrated in the graph A at "Deterioration 2" to "Deterioration 5" are larger than the state numerical values illustrated in the graph C.

The label 211 indicates a difference between the signal data in the normal state (Normal) of the device and signal data at the deterioration stage 1 (Deterioration 1) of the device. The label 211 illustrates information "Deterioration 1: 10 kHz-40 kHz, +1 dB". The label means that "the signal data in Deterioration 1 has a higher amplitude component in the frequency band of 10 kHz to 40 kHz than the signal data in the normal state by 1 dB at most". In the same manner, the label 212 indicates a difference between the signal data in the normal state (Normal) of the device and signal data at the deterioration stage 2 (Deterioration 2) of the device. The label 212 illustrates information "Deterioration 2: 10 kHz-40 kHz, +2 dB". The label means that "the signal data in Deterioration 2 has a higher amplitude component in the frequency band of 10 kHz to 40 kHz than the signal data in the normal state by 2 dB at most". In the same manner, the label 213 indicates a difference between the signal data in the normal state (Normal) of the device and signal data at the deterioration stage 3 (Deterioration 3) of the device. The label 213 illustrates information "Deterioration 3: 10 kHz-40 kHz, +3 dB". The label means that "the signal data in Deterioration 3 has a higher amplitude component in the frequency band of 10 kHz to 40 kHz than the signal data in the normal state by 3 dB at most".

The model determination unit 40 determines whether or not the ratio (also referred to as "increasing rate") of the increase quantity of the signal data to the increase quantity of the state numerical value is fixed in the deterioration stages (Deterioration 1 to Deterioration 5). As a matter of course, the two increase quantities may be exchanged, and the model determination unit 40 may determine whether or not the ratio of the increase quantity of the state numerical value to the increase quantity of the signal data is fixed in the deterioration stages (Deterioration 1 to Deterioration 5). In this example, attention is paid to the ratio of the former, for the sake of convenience of explanation.

For example, the model determination unit 40 determines whether or not the increase ratio described above is fixed, as follows. First, the model determination unit 40 sets "a" as a difference between the state numerical value in the normal state of the device and the state numerical value in Deterioration 1 of the device, sets "b" as a difference between the state numerical value in the normal state of the device and the state numerical value in Deterioration 2 of the device, and sets "c" as a difference between the state numerical value in the normal state of the device and the state numerical value in Deterioration 3 of the device. The label 211 illustrates that the signal data increases by 1 dB at most when the state numerical value increases by the difference "a" from Normal to Deterioration 1. In the same manner, the label 212 illustrates that the signal data increases by 2 dB at most when the state numerical value increases by the difference "b" from Normal to Deterioration 2. In the same manner, the label 213 illustrates that the signal data increases by 3 dB at most when the state numerical value increases by the difference "c" from Normal to Deterioration 3.

Thereafter, the model determination unit 40 calculates the increasing rate "1 dB/a" in Deterioration 1, the increasing rate "2 dB/b" in Deterioration 2, and the increasing rate "3 dB/c" in Deterioration 3. The model determination unit 40 calculates the increasing rate in each of the other deterioration stages (Deterioration 4 and Deterioration 5) by the same method as described above. When it is determined that the calculated increasing rates in the deterioration stages (Deterioration 1 to Deterioration 5) are fixed, the model determination unit 40 determines that the state diagnosis model 31 is valid. By contrast, when it is determined that the calculated increasing rates in the deterioration stages (Deterioration 1 to Deterioration 5) are not fixed, the model determination unit 40 determines that the state diagnosis model 31 is not valid.

For example, suppose that the state numerical value and the signal data has proportional connection "when the state numerical value increases by s (s is an any real number), the signal data increases by t (t is an any real number)". In this case, it suffices that the model determination unit 40 determines whether or not the increasing rate in the deterioration stages (Deterioration 1 to Deterioration 5) agrees with the proportional constant "t/s" indicating the proportional connection described above.

Suppose that the graph A in FIG. 6 illustrates change of the state numerical value when the increasing rate in the deterioration stages is fixed. When the model determination unit 40 determines that the state numerical values output from the state diagnosis model 31 for the multistage deterioration data 20 monotonously increase as illustrated in the graph A, the model determination unit 40 determines that the state diagnosis model 31 is valid. By contrast, suppose that the graph C in FIG. 7 illustrates change of the state numerical value when the increasing rate in the deterioration stages is not fixed. When the model determination unit 40 determines that the state numerical values output from the state diagnosis model 31 for the multistage deterioration data 20 monotonously increase as illustrated in the graph C, the model determination unit 40 determines that the state diagnosis model 31 is not valid.

The model determination unit 40 may set the tolerance (error) of the increasing rate, and determine that the model is valid when the increasing rate in the deterioration stages falls within the tolerance. Also in the case where the state numerical values monotonously decrease, it suffices that the model determination unit 40 determines whether or not the ratio (also referred to as "decreasing rate") of the decrease quantity of the signal data to the decrease quantity of the state numerical value is fixed in the deterioration stages (Deterioration 1 to Deterioration 5) in the same manner.

As described above, the model determination unit 40 determines validity of the state diagnosis model 31 by comparing change of the state numerical value in the deterioration stages (Deterioration 1 to Deterioration 5) with change of the signals data in the deterioration stages (Deterioration 1 to Deterioration 5) illustrated with a plurality of labels 211, 212, 213, . . . . As described above, the graph A illustrated in FIG. 6 and the graph C illustrated in FIG. 7 illustrate examples in which the state numerical values monotonously increase, but they are mutually different in increasing rate in the deterioration stages. The state diagnosis apparatus 1B according to the second embodiment determines whether or not the ratio (also referred to as "change rate") of the change quantity of the state numerical value output from the state diagnosis model 31 for the multistage deterioration data 20 to the change quantity of the signal data illustrated with the multistage deterioration label 21 is fixed in the deterioration stages. In this manner, the state diagnosis apparatus 1B determines whether or not monotonous change of the state numerical value is valid in comparison with change of the signal data. Specifically, it can be said that the state diagnosis apparatus 1B more strictly determines validity of the state diagnosis model.

Figure 8:
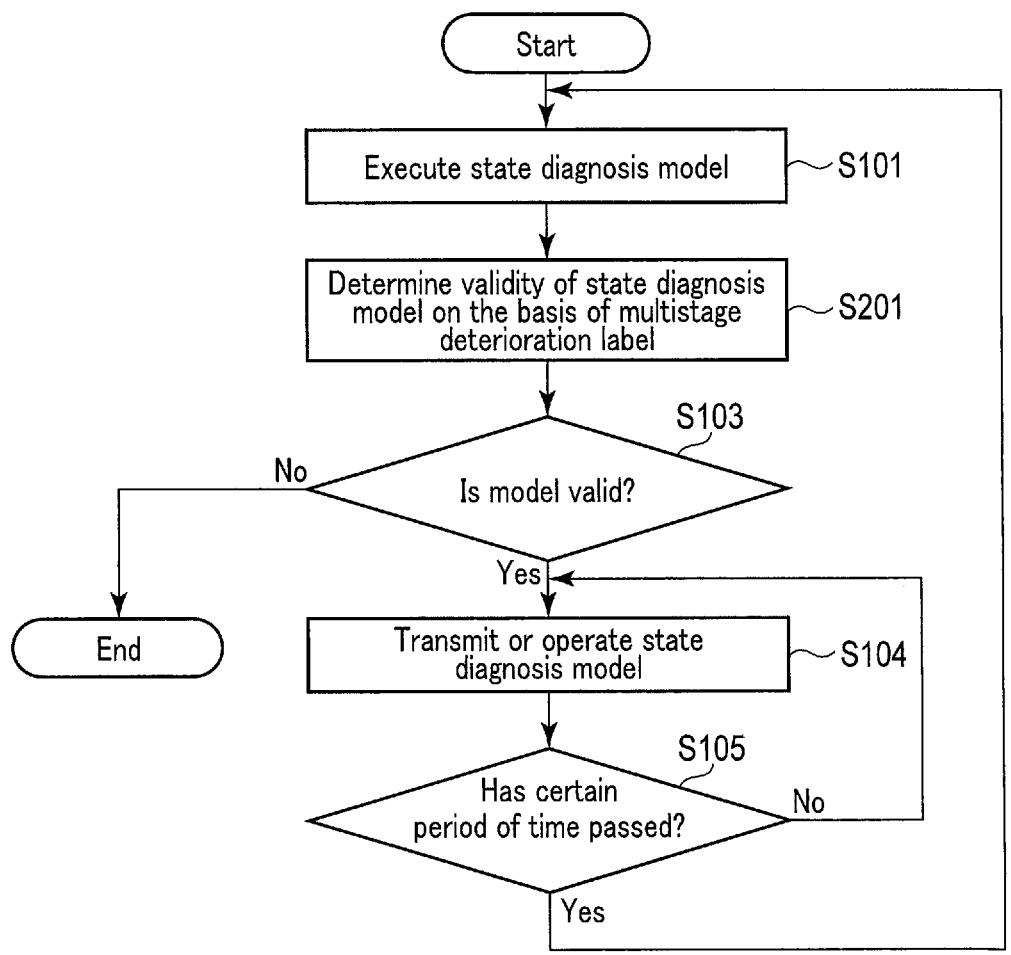
FIG. 8 is a diagram illustrating an operation example of the state diagnosis apparatus according to the second embodiment.

FIG. 8 is a diagram illustrating an operation example of the state diagnosis apparatus 1B according to the second embodiment.

In the operation example, steps each executing the same processing as that in the first embodiment are denoted by the same reference numerals as those in the first embodiment, and an explanation thereof is omitted. In this example, attention is paid to steps executing processing different from that of the first embodiment.

At Step S201 (modification of Step S102), the state diagnosis apparatus 1B determines validity of the state diagnosis model 31 on the basis of the multistage deterioration label 21. Specifically, the model determination unit 40 of the state diagnosis apparatus 1B determines whether or not the state numerical values output from the state diagnosis model 31 monotonously change, in comparison with the multistage deterioration label 21.

The state diagnosis apparatus 1B according to the second embodiment described above is capable of determining validity of the model diagnosing the state of the device. The state diagnosis apparatus 1B is also capable of comparing change of the state numerical value output from the state diagnosis model 31 for the multistage deterioration data 20 with change of the signal data illustrated with the multistage deterioration label 21, and more strictly determining validity of the state diagnosis model 31.

Third Embodiment

FIG. 9 is a diagram illustrating a configuration example of a state diagnosis apparatus 1C according to the third embodiment.

The state diagnosis apparatus 1C according to the third embodiment further includes a multistage deterioration generation unit 60, in addition to the constituent elements (model execution unit 30, state diagnosis model 31, model determination unit 40, and transmission unit 50) included in the state diagnosis apparatus 1A according to the first embodiment. The constituent elements other than the multistage deterioration generation unit 60 are supposed to be the same as those in the first embodiment, and an explanation thereof is omitted. The state diagnosis apparatus 1C according to the third embodiment spuriously generates multistage deterioration data 20 on the basis of normal data 22 and a multistage deterioration parameter 23.

The normal data 22 is signal data relating to the initial state (normal state) before use of the device at the stage before the device deteriorates. The normal data 22 may be one-dimensional signal data relating to acceleration and/or vibration of the device, or two-dimensional signal data relating to the image and/or moving images output from the device, in the same manner as the multistage deterioration data 20. In the present embodiment, suppose that the normal data 22 is signal data relating to sound of the device at the stage before the device deteriorates.

The multistage deterioration parameter 23 is a parameter indicating the degree of deterioration of the device at respective deterioration stages after respective certain periods of time has passed from the normal state. Specifically, the multistage deterioration parameter 23 is a parameter indicating differences between the normal data 22 indicating signal data at the stage before deterioration of the device and the signal data at the respective stages after the device deteriorates. For example, when deterioration tendency of a device of the same type as that of the device serving as the target of diagnosis with the state diagnosis model 31 is known, the multistage deterioration parameter 23 is artificially or mechanically generated on the basis of the deterioration tendency. It can be said that the multistage deterioration parameter 23 is a parameter to spuriously generate deterioration of the device serving as the diagnosis target.

The multistage deterioration label 21 in the second embodiment and the multistage deterioration parameter 23 in the third embodiment can be regarded as similar data in that each of them indicates differences between signal data in the normal state of the device and signal data in the respective deterioration states of the device. However, they are different in that the multistage deterioration parameter 23 is generated on the basis of ordinary deterioration tendency of the device serving as the diagnosis target to generate the multistage deterioration data 20, while the multistage deterioration label 21 is generated from the multistage deterioration data 20. Specifically, the multistage deterioration label 21 and the multistage deterioration parameter 23 can be regarded as similar data having mutually different derivation.

The multistage deterioration generation unit 60 spuriously generates multistage deterioration data 20 on the basis of the normal data 22 and the multistage deterioration parameter 23. The multistage deterioration generation unit 50 may be implemented with a machine learning model, in the same manner as the model determination unit 40. For example, when the multistage deterioration data 20 to be spuriously generated is signal data relating to sound of the device, the multistage deterioration generation unit 60 executes equalization processing to apply the multistage deterioration parameter 23 to the normal data 22.

Figure 10:
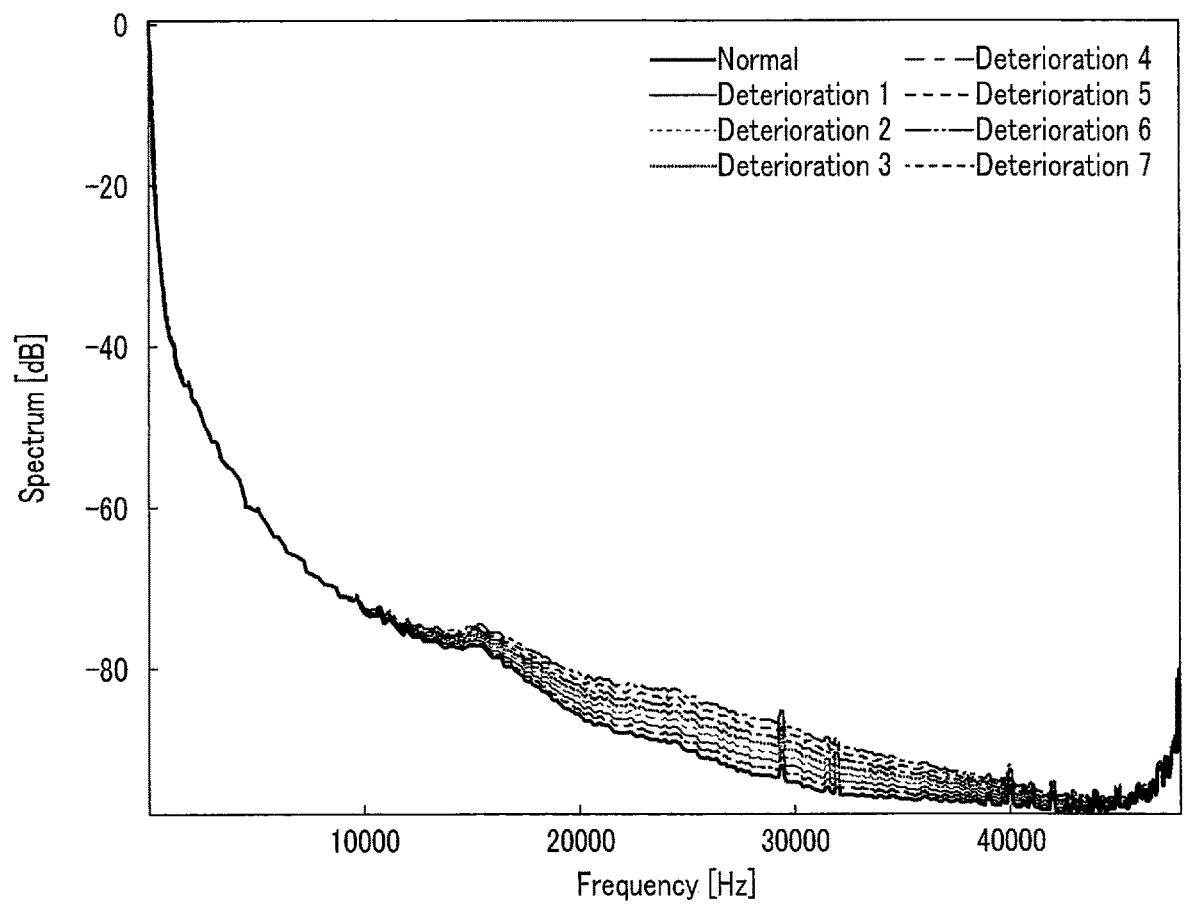
FIG. 10 is a diagram illustrating an example of spuriously generated multistage deterioration data.

FIG. 10 is a diagram illustrating an example of the spuriously generated multistage deterioration data 20.

FIG. 10 illustrates signal data indicating the deterioration state at each of stages (Normal to Deterioration 7) of the device. In this example, the frequency spectra relating to the operating sound at the respective stages of a rotary machine are illustrated with different graphs, as examples of the signal data. Specifically, as the stage of deterioration progresses, data in which the amplitude component of the frequency band of 10000 Hz (10 kHz) to 40000 HZ (40 kHz) gradually increases (rises) is spuriously generated.

For example, suppose that the normal data 22 is signal data indicating the frequency spectrum in the normal state of the rotary machine. In this example, suppose that the multistage deterioration parameter 23 includes a parameter "the frequency spectrum at the deterioration stage 1 (Deterioration 1) includes a higher amplitude component in the frequency band of 10 kHz to 40 kHz than that of the frequency spectrum in the normal state by 1 dB at most". The multistage deterioration generation unit 60 generates a frequency spectrum in Deterioration 1 by executing equalization processing to apply the parameter to the normal data 22. In the same manner, suppose that the multistage deterioration parameter 23 includes a parameter "the frequency spectrum at the deterioration stage 2 (Deterioration 2) includes a higher amplitude component in the frequency band of 10 kHz to 40 kHz than that of the frequency spectrum in the normal state by 2 dB at most". The multistage deterioration generation unit 60 generates a frequency spectrum in Deterioration 2 by executing equalization processing to apply the parameter to the normal data 22. Similar processing is repeated also for each of the subsequent deterioration stages (Deterioration 3 to Deterioration 7). In this manner, frequency spectrum at the respective deterioration stages (Deterioration 1 to Deterioration 7) are spuriously generated.

As described above, the multistage deterioration generation unit 60 spuriously generates multistage deterioration data 20 on the basis of the normal data 22 and the multistage deterioration parameter 23. The spuriously generated multistage deterioration data 20 is used as input data of the state diagnosis model 31.

Figure 11:
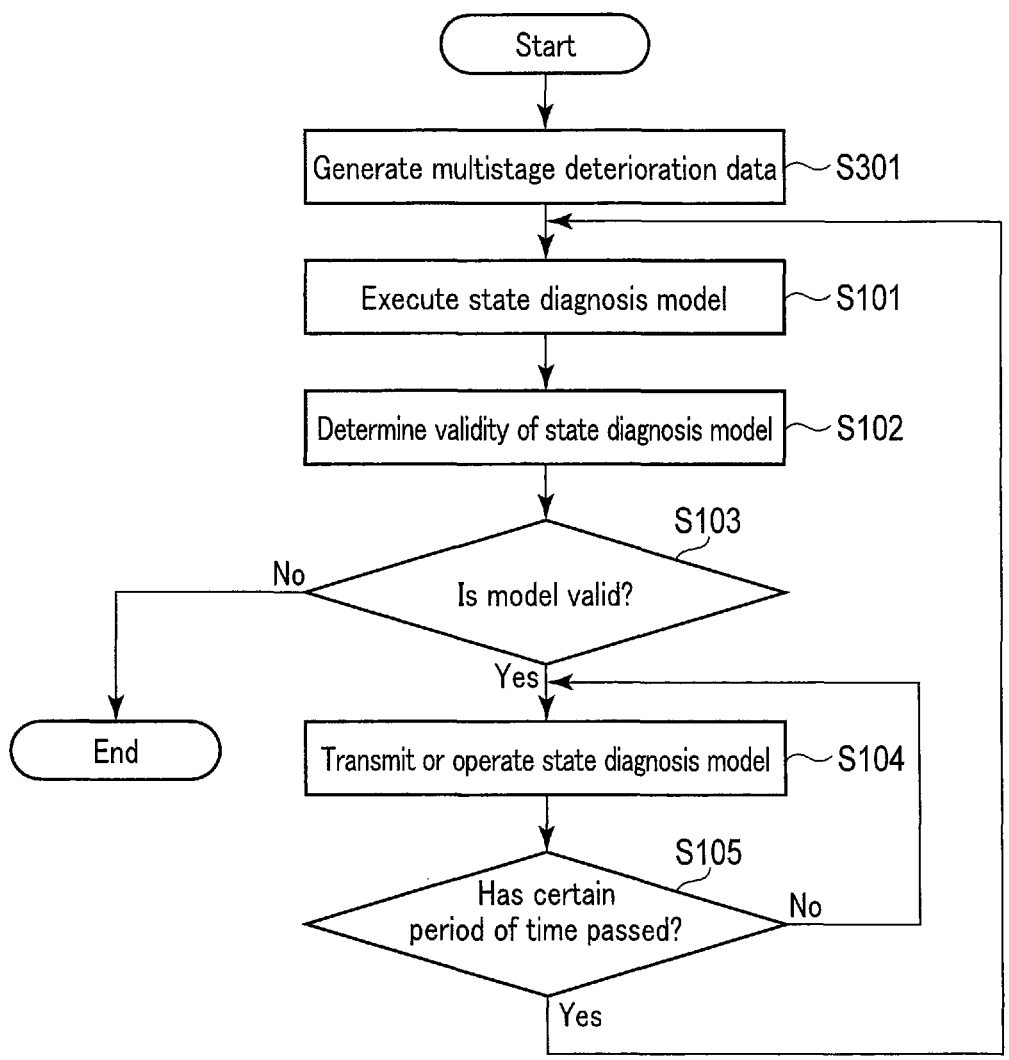
FIG. 11 is a diagram illustrating an operation example of the state diagnosis apparatus according to the third embodiment.

FIG. 11 is a diagram illustrating an operation example of the state diagnosis apparatus 1C according to the third embodiment.

In the present operation example, steps each executing the same processing as that in the first embodiment are denoted by the same reference numerals as those in the first embodiment, and an explanation thereof is omitted. In this example, attention is paid to steps executing processing different from that of the first embodiment.

At Step S301 (preprocessing of Step S101), the state diagnosis apparatus 1C generates multistage deterioration data 20. Specifically, the multistage deterioration generation unit 60 of the state diagnosis apparatus 1C spuriously generates multistage deterioration data 20 on the basis of the normal data 22 and the multistage deterioration parameter 20.

The state diagnosis apparatus 1C according to the third embodiment described above is capable of determining validity of the model diagnosing the state of the device.

The state diagnosis apparatus 1C is also capable of spuriously generating multistage deterioration data 20 serving as input data of the state diagnosis model 31 on the basis of the normal data 22 and the multistage deterioration parameter 23. Specifically, the state diagnosis apparatus 1C is capable of spuriously generating multistage deterioration data 20 even when multistage deterioration data 20 as actual data cannot be acquired or has not been acquired.

Fourth Embodiment

FIG. 12 is a diagram illustrating a configuration example of a state diagnosis apparatus 1D according to the fourth embodiment.

The state diagnosis apparatus 1D according to the fourth embodiment includes a variance/average calculation unit 70, in addition to the constituent elements (model execution unit 30, state diagnosis model 31, model determination unit 40, and transmission unit 50) included in the state diagnosis apparatus 1A according to the first embodiment. The constituent elements other than the variance/average calculation unit 70 are supposed to be the same as those in the first embodiment, and an explanation thereof is omitted. The state diagnosis apparatus 1D according to the fourth embodiment calculates variance and average of a plurality of state numerical values at respective stages of the device, and determines validity of the state diagnosis model 31, in the case where a plurality of state numerical values are assigned to a stage of the device (one-to-many correspondence).

The variance/average calculation unit 70 calculates variance and average of the state numerical values for distribution of state numerical values output from the state diagnosis model 31. The model determination unit 40 determines whether or not variances of the state numerical values in the stages have a predetermined value or less with progress of deterioration of the device, and whether or not the averages of the state numerical values in the stages monotonously change with progress of deterioration of the device.

Figure 13:
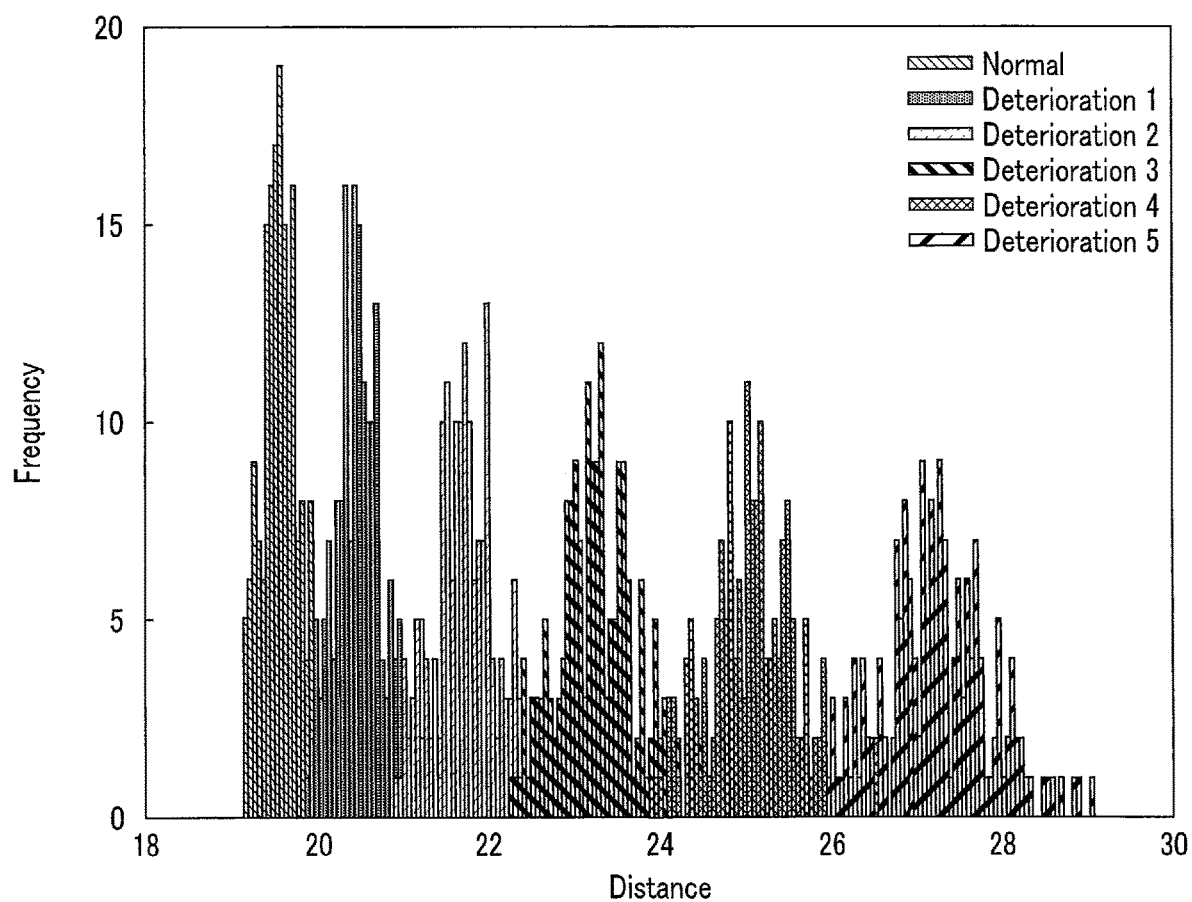
FIG. 13 is a diagram illustrating an example of distribution of state numerical values.

FIG. 13 is a diagram illustrating an example of distribution of the state numerical values.

FIG. 13 illustrates distribution of state numerical values in each of the stages (Normal to Deterioration 5) of the device. Specifically, FIG. 13 illustrates a histogram including the horizontal axis indicating the value (Distance) of each of the state numerical values and the vertical axis indicating the number (Frequency) of state numerical values having the value. For example, with respect to distribution of the state numerical values in the normal state (Normal), 4 to 19 state numerical values are distributed in the range with the value region of approximately 19 to 20. In the same manner, with respect to distribution of the state numerical values in Deterioration 1, 1 to 16 state numerical values are distributed in the range with the value region of 20 to 21.

For example, the variance/average calculation unit 70 calculates the variance and the average of the state numerical values for each distribution of state numerical values by the following numerical expression (1) and numerical expression (2).

[Expression 1]

$$V = \frac{1}{n}\sum_{i=1}^{n}(xi - A)^2 \quad (1)$$

In the numerical expression (1), V denotes variance of the state numerical values, Xi denotes a value of each of n (n is a natural number) state numerical values, and A denotes the average of the state numerical values. A is calculated with the following numerical expression (2).

[Expression 2]

$$A = \frac{1}{n}\sum_{i=1}^{n}xi \quad (2)$$

FIG. 13 illustrates the case where the variance of state numerical values at each of the stages (Normal to Deterioration 5) has a predetermined value or less. In addition, FIG. 13 illustrates the case where the averages of the state numerical values in the stages (Normal to Deterioration 5) monotonously increase. As described above, when the model determination unit 40 determines that the variances of state numerical values in the stages have a predetermined value or less and that the averages of the state numerical values in the stages monotonously change. In the case where a state numerical value is assigned to a stage of the device (one-to-one correspondence), the variance of the state numerical value at each of the stages is 0, and the average of the state numerical values at each of the stages is expected to be the same as the value of the state numerical value at each of the stages. Specifically, in this case, because determining whether or not the averages of the state numerical values in the stages monotonously change is equal to determining whether or not the values of the state numerical values in the stages monotonously change, it can be regarded as being the same as determination in the first embodiment.

By contrast, the model determination unit 40 determines that the state diagnosis model 31 is not valid, in at least one of the case where the model determination unit 40 determines that the variance of the state numerical values with progress of deterioration does not have a predetermined value or less and the case where the model determination unit 40 determines that the averages of the state numerical values with progress of deterioration do not monotonously change. For example, when variances of the state numerical values with progress of deterioration have a value larger than the predetermined value, distribution of the state numerical values is expected to extend to be larger in the lateral direction than the distribution of the state numerical values illustrated in FIG. 13.

As described above, the model determination unit 40 determines validity of the state diagnosis model 31. The state diagnosis model 31 determined as a valid model may be transmitted to the external device with the transmission unit 50, in the same manner as the first embodiment. In addition, distribution of the state numerical values output from the state diagnosis model 31 may be displayed as a histogram as illustrated in FIG. 13 in the external device or the state diagnosis apparatus 1D.

Figure 14:
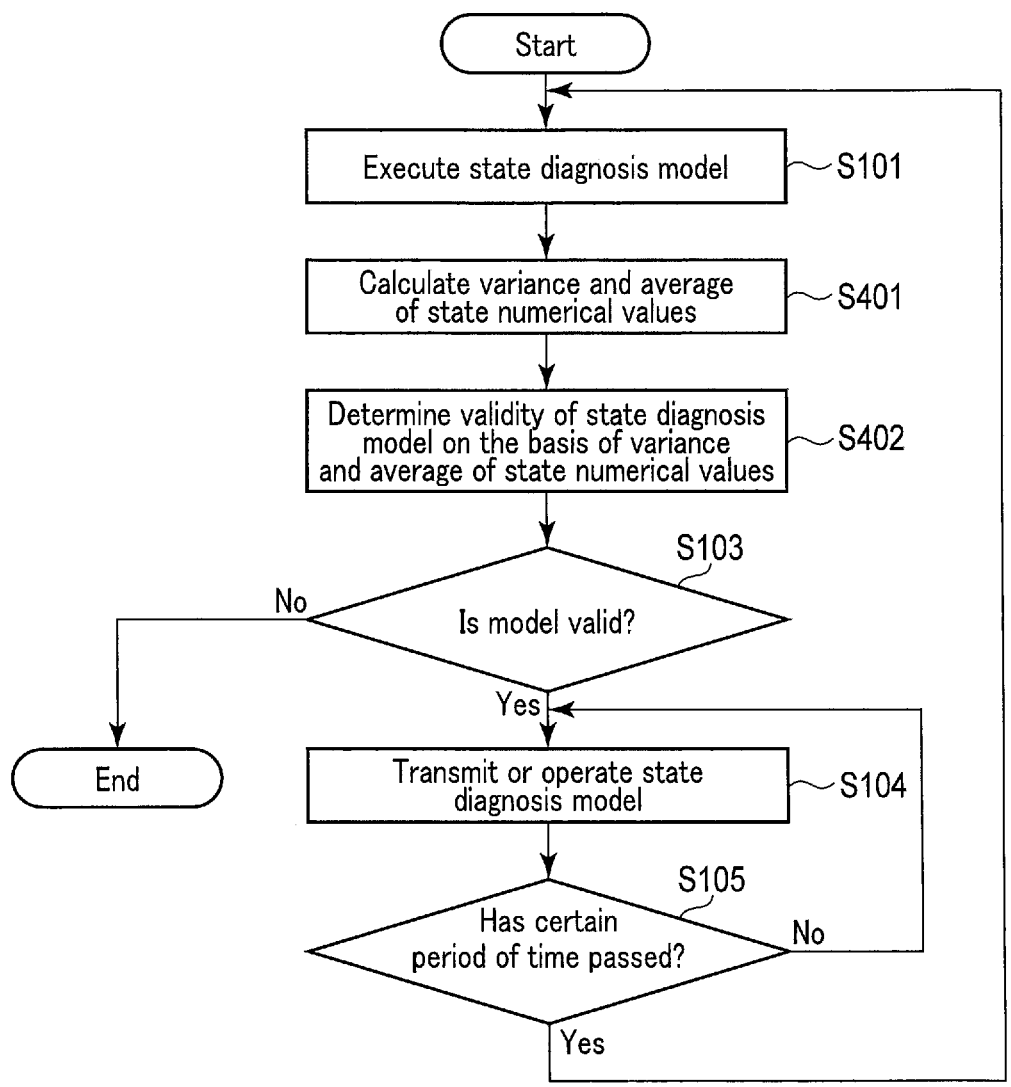
FIG. 14 is a diagram illustrating an operation example of the state diagnosis apparatus according to the fourth embodiment.

FIG. 14 is a diagram illustrating an operation example of the state diagnosis apparatus 1D according to the fourth embodiment.

In the present operation example, steps each executing the same processing as that in the first embodiment are denoted by the same reference numerals as those in the first embodiment, and an explanation thereof is omitted. In this example, attention is paid to steps executing processing different from that of the first embodiment.

At Step S401 (postprocessing of Step S101), the state diagnosis apparatus 1D calculates the variance and the average of the state numerical values. Specifically, the variance/average calculation unit 70 of the state diagnosis apparatus 1D calculates the variance and the average of the state numerical values for the distribution of the state numerical values output from the state diagnosis model 31.

At Step S402 (modification of Step S102), the state diagnosis apparatus 1D determines validity of the state diagnosis model on the basis of the variance and the average of the state numerical values. Specifically, the model determination unit 40 of the state diagnosis apparatus 1D determines whether or not the variances of the state numerical values in the stages have a predetermined value or less with progress of deterioration of the device, and whether or not the averages of the state numerical values in the stages monotonously change with progress of deterioration of the device.

The state diagnosis apparatus 1D according to the fourth embodiment described above is capable of determining validity of the model diagnosing the state of the device. In addition, the state diagnosis apparatus 1D is capable of determining validity of the model also in the case where the state diagnosis model 31 outputs a plurality of state numerical values at each of stages of the device.

Fifth Embodiment

FIG. 15 is a diagram illustrating a configuration example of a state diagnosis apparatus 1E according to the fifth embodiment.

The state diagnosis apparatus 1E according to the fifth embodiment includes a model training unit 80, in addition to the constituent elements (model execution unit 30, state diagnosis model 31, model determination unit 40, and transmission unit 50) included in the state diagnosis apparatus 1A according to the first embodiment. The constituent elements other than the model training unit 80 are supposed to be the same as those in the first embodiment, and an explanation thereof is omitted. The state diagnosis apparatus 1E according to the fifth embodiment generates the state diagnosis model 31 from a neural network or the like, and trains the state diagnosis model 31 determined as an invalid model.

Training data 24 is data to train the state diagnosis model 31. The training data 24 may be, for example, the multistage deterioration data 20 itself, data including part thereof, or only signal data relating to the normal state of the device. As another example, the training data 24 may include a data set including data similar to the multistage deterioration data 20 and serving as input data and the state numerical value corresponding to the input data and serving as correct data. Specifically, the training data 24 may be any data as long as it relates to the state of the device.

The model training unit 80 trains the state diagnosis model 31 using the training data 24. The model determination unit 40 determines validity of the trained state diagnosis model 31. When it is determined that the trained state diagnosis model 31 is not valid, the model training unit 80 trains a state diagnosis model 31 again with changed training data 24. As another example, when it is determined that the trained state diagnosis model 31 is not valid, the model training unit 80 trains a state diagnosis model 31 again with a changed parameter of the state diagnosis model 31.

For example, when the state diagnosis model 31 is a machine learning model based on a neural network, the model training unit 80 may change a parameter relating to weighting of coupling of the neural network, or change a hyperparameter defining the structure of the neural network.

Figure 16:
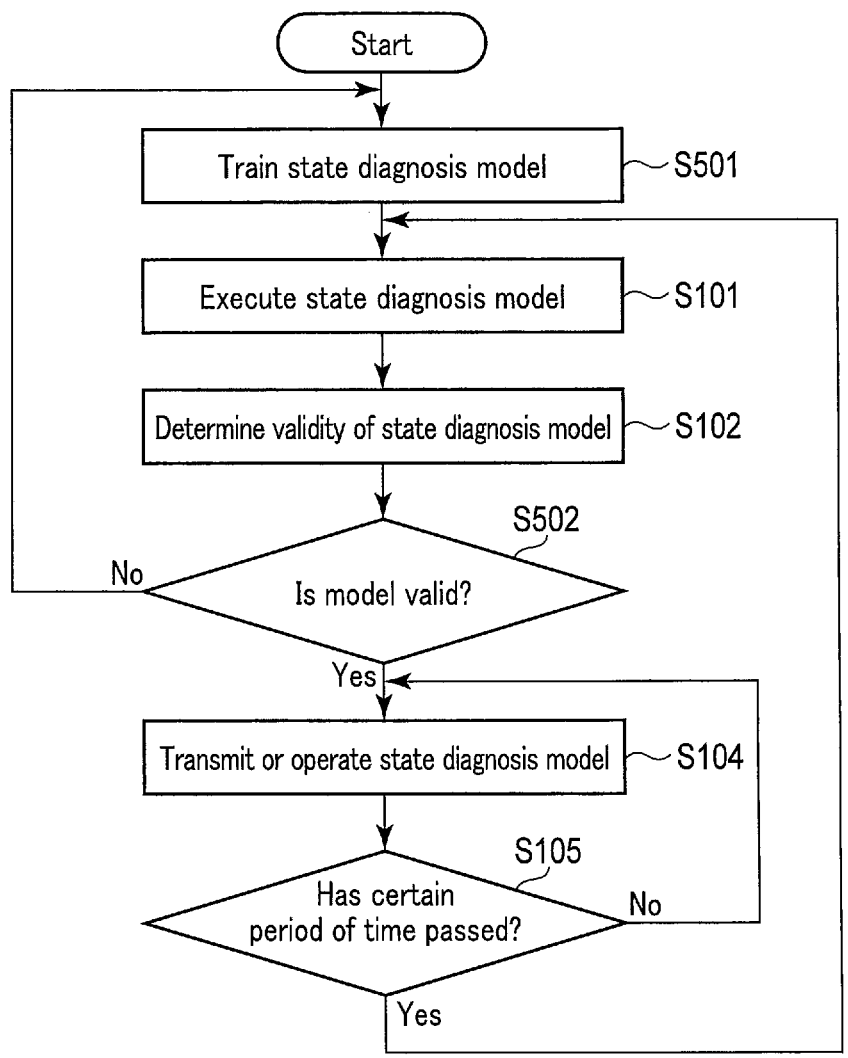
FIG. 16 is a diagram illustrating an operation example of the state diagnosis apparatus according to the fifth embodiment.

FIG. 16 is a diagram illustrating an operation example of the state diagnosis apparatus 1E according to the fifth embodiment.

In the present operation example, steps each executing the same processing as that in the first embodiment are denoted by the same reference numerals as those in the first embodiment, and an explanation thereof is omitted. In this example, attention is paid to steps executing processing different from that of the first embodiment.

At Step S501 (preprocessing of Step S101), the state diagnosis apparatus 1E trains the state diagnosis model 31. Specifically, the model training unit 80 of the state diagnosis apparatus 1E trains the state diagnosis model 31 using the training data 24.

At Step S502 (modification of Step S103), the state diagnosis apparatus 1E selects processing to be executed next, in accordance with whether or not the state diagnosis model 31 is valid. Specifically, when it is determined that the state diagnosis model 31 is valid (Yes at Step S502), the state diagnosis apparatus 1E executes Step S104. By contrast, when it is determined that the state diagnosis model 31 is not valid (No at Step S502), the state diagnosis apparatus 1E returns to Step S501, and trains a state diagnosis model 31 again.

The state diagnosis apparatus 1E according to the fifth embodiment as described above is capable of determining validity of the model diagnosing the state of the device. In addition, the state diagnosis apparatus 1E is capable of generating a state diagnosis model 31 on the basis of the training data 24. This structure enables the state diagnosis apparatus 1E is capable of determining validity also for the state diagnosis model 31 generated inside with the model training unit 80, as well as the state diagnosis model 31 received from outside. The state diagnosis apparatus 1E is also capable of repeatedly executing training of the state diagnosis model 31 determined as an invalid model such that the model becomes valid.

Hardware Configuration Example

Figure 17:
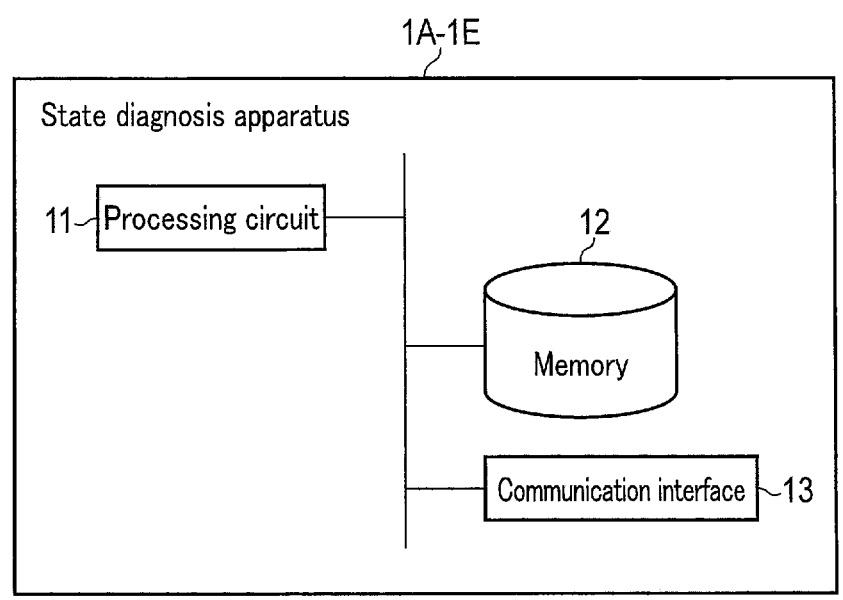
FIG. 17 is a diagram illustrating a hardware configuration example of the state diagnosis apparatuses according to the first to the fifth embodiments.

FIG. 17 is a diagram illustrating a hardware configuration example of the state diagnosis apparatuses 1A to 1E according to the first to the fifth embodiments.

The processing circuit 11 controls operations of each of the state diagnosis apparatuses 1A to 1E. The processing circuit 11 includes a processor, such as a CPU (Central Processing Unit), a MPU (Micro Processing Unit), and a GPU (Graphics Processing Unit), as the hardware. The processing circuit 11 executes programs developed onto a memory 12 via the processor to execute the units corresponding to the respective programs. The units are not necessarily implemented with the processing circuit 11 formed of a single processor. For example, the units may be implemented with the processing circuit 11 formed of a combination of a plurality of processors. The processing circuit 11 includes the model execution unit 30, the model determination unit 40, and the transmission unit 50. The processing circuit 11 may include the multistage deterioration generation unit 60, the variance/average calculation unit 70, and the model training unit 80.

The memory 12 stores therein information, such as data and programs used with the processing circuit 11. The memory 12 includes a semiconductor memory device, such as a RAM (Random Access Memory), as the hardware. The memory 12 may be a drive device writing and reading information to and from an external storage device, such as magnetic disk (floppy (registered trademark) disk, hard disk), a magneto-optical disk (MO), an optical disk (CD, DVD, Blu-ray (registered trademark)), a flash memory (USB flash memory, memory card, SSD), and a magnetic tape. The storage area of the memory 12 may be located inside the state diagnosis apparatus 1A or in the external storage device. The memory 12 may include the multistage deterioration data 20. The memory 12 may include the multistage deterioration label 21, the normal data 22, the multistage deterioration parameter 23, and the training data 24.

A communication interface 13 transmits and receives various data between each of the state diagnosis apparatuses 1A to 1E to the external device. Any communication standard may be used between the communication interface 13 and the external device.

The state diagnosis apparatuses 1A to 1E according to the first to the fifth embodiments have been explained above. A state diagnosis apparatus may be formed by combining functions of the state diagnosis apparatuses 1A to 1E according to the embodiments. Specifically, a state diagnosis apparatus may be formed by combining the constituent elements included in the state diagnosis apparatuses 1A to 1E as desired. The following is an explanation of state diagnosis systems 100A and 100B according to sixth and seventh embodiments. Each of the state diagnosis apparatuses 1A to 1E may be used in the state diagnosis systems 100A and 100B. Specifically, various combinations may be formed by combining the state diagnosis apparatuses 1A to 1E according to the embodiments and the state diagnosis systems 100A and 100B according to the embodiments. The following explanation illustrates examples in which each of the state diagnosis systems 100A and 100B includes the state diagnosis apparatus 1A according to the first embodiment.

Sixth Embodiment

Figure 18:
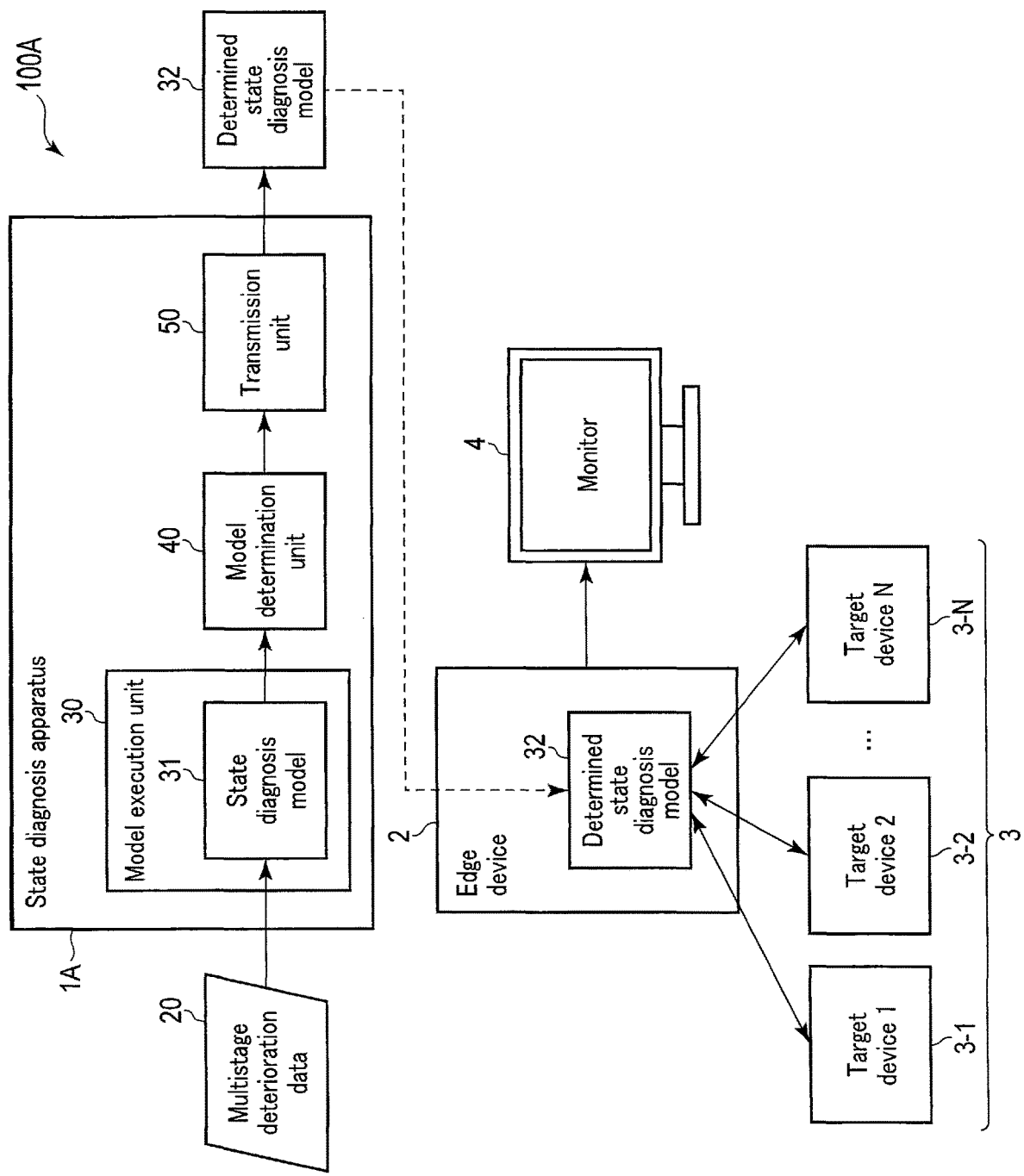
FIG. 18 is a diagram illustrating a configuration example of a state diagnosis system according to a sixth embodiment.

FIG. 18 is a diagram illustrating a configuration example of the state diagnosis system 100A according to the sixth embodiment. The state diagnosis system 100A includes the state diagnosis apparatus 1A, an edge device 2, a plurality of target devices 3 (target device 1, target device 2, ..., target device N (3-1, 3-2, ..., 3-N)), and a monitor 4. The state diagnosis apparatus 1A and the edge device 2 are connected to be communicatable with each other. The edge device 2 is also connected with the target devices 3 and the monitor 4 to be communicatable with each other. The type of the communication system is not limited to wired or wireless system.

In the state diagnosis system 100A, the state diagnosis apparatus 1A transmits the determined state diagnosis model 32 determined as a valid model to the edge device 2. The edge device 2 executes state diagnosis for each of the target devices 3 using the transmitted determined state diagnosis model 32. In this operation, for example, sensors installed in the respective target devices 3 may transmit signal data relating to the states of the respective devices to the edge device 2. As another example, each of the target devices 3 may directly transmit signal data relating to the state of the device to the edge device 2.

The edge device 2 executes the determined state diagnosis model 32 to cause the determined state diagnosis model 32 to output state numerical values quantitatively indicating the signal data acquired from the target devices 3. The output state numerical values are displayed on the monitor 4. In this operation, the state numerical value of the device may be displayed for each of the target devices 3.

As described above, the state diagnosis system 100A determines validity of the state diagnosis model 31, and operates the determined state diagnosis model 32 determined as a valid model. In the state diagnosis system 100A, mutually different devices execute determination of validity of the state diagnosis model 31 and operation of the determined state diagnosis model 32. After a certain period of time from the start of operation of the determined state diagnosis model 32, the state diagnosis apparatus 1A may determine again validity of the determined state diagnosis model 32 transmitted to the edge device 2.

The state diagnosis system 100A according to the sixth embodiment described above is capable of determining validity of the model diagnosing the state of the device.

In addition, in the state diagnosis system 100A, the state diagnosis apparatus 1A transmits the determined state diagnosis model 32 determined as a valid model to the edge device 2. With this structure, because it is unnecessary for the edge device 2 to determine validity of the model, even the edge device 2 having relatively small calculation resources and/or memory is capable of executing the state diagnosis for the device using the received model. Specifically, the state diagnosis system 100A saves the quantity of calculation resources required with the edge device 2. In addition, when the edge device 2 is portable, for example, the engineer is enabled to carry the edge device 2 and execute the state diagnosis for the device using the edge device 2.

Seventh Embodiment

FIG. 19 is a diagram illustrating a configuration example of the state diagnosis system 100B according to the seventh embodiment. The state diagnosis system 100B includes the state diagnosis apparatus 1A, a plurality of target devices 3 (target device 1, target device 2, ..., target device N (3-1, 3-2, ..., 3-N)), and a monitor 4. The state diagnosis apparatus 1A is connected with the target devices 3 and the monitor 4 to be communicatable with each other. The type of the communication system is not limited to wired or wireless system.

In the state diagnosis system 100B, the state diagnosis apparatus 1A executes state diagnosis for each of the target devices 3 using the determined state diagnosis model 32 determined as a valid model. In this operation, for example, sensors installed in the respective target devices 3 may transmit signal data relating to the states of the respective devices to the state diagnosis apparatus 1A. As another example, each of the target devices 3 may directly transmit signal data relating to the state of the device to the state diagnosis apparatus 1A.

The state diagnosis apparatus 1A executes the determined state diagnosis model 32 to cause the determined state diagnosis model 32 to output state numerical values quantitatively indicating the signal data acquired from the target devices 3. The output state numerical values are displayed on the monitor 4. In this operation, the state numerical value of the device may be displayed for each of the target devices 3.

As described above, the state diagnosis system 100B determines validity of the state diagnosis model 31, and operates the determined state diagnosis model 32 determined as a valid model. In the state diagnosis system 100B, the same device executes determination of validity of the state diagnosis model 31 and operation of the determined state diagnosis model 32. After a certain period of time from the start of operation of the determined state diagnosis model 32, the state diagnosis apparatus 1A may determine validity of the determined state diagnosis model 32 again.

The state diagnosis system 100B according to the seventh embodiment described above is capable of determining validity of the model diagnosing the state of the device. In addition, the state diagnosis system 100B is capable of executing the state diagnosis for the device using the model determined as a valid model. In addition, the state diagnosis system 100B transmits the state numerical values output from the model to the external device, and the external device is enabled to display the received state numerical values.

The state diagnosis systems 100A and 100B according to the sixth and the seventh embodiments have been explained above. The following is an explanation of the case where the state diagnosis system 100A or 100B monitors the deterioration states of a plurality of cooling fans serving as the target devices 3, as an application example.

Application Example

For example, the state diagnosis system 100A or 100B monitors the deterioration states of cooling fans installed in an uninterruptible power supply (UPS). The cooling fans discharge heat in the UPS. When the cooling fans stop, the UPS itself also stops. For this reason, it is required from the viewpoint of preventive maintenance of the device to sense the deterioration states of the cooling fans and replace or maintain the cooling fans before the cooling fans stop due to malfunction.

For example, microphones are installed by the side of the respective cooling fans. The state diagnosis system 100A or 100B monitors the deterioration states of the cooling fans on the basis of signal data acquired from the microphones and relating to the operating sound of the cooling fans. The signal data is transmitted to the determined state diagnosis model 32 in the state diagnosis system 100A or 100B. The state diagnosis system 100A or 100B monitors the deterioration states of the cooling fans with the state numerical values output from the determined state diagnosis model 32. Specifically, the state diagnosis system 100A monitors the deterioration states of the cooling fans using the determined state diagnosis model 32 in the edge device 2 installed in the vicinity of the cooling fans. By contrast, the state diagnosis system 100B monitors the deterioration states of the cooling fans using the determined state diagnosis model 32 in the state diagnosis apparatus 1A.

In the state diagnosis system 100A, when the determined state diagnosis model 32 of the edge device 2 senses the deterioration state of the cooling fans, the edge device 2 may notify the control room and monitoring staff or the like of the sensing result using the monitor 4, an LED, and/or a buzzer or the like. Specifically, the edge device 2 may notify the control room and monitoring staff or the like of the sensing result by communication. By contrast, in the state diagnosis system 100B, when the determined state diagnosis model 32 of the state diagnosis apparatus 1A senses the deterioration state of the cooling fans, the state diagnosis apparatus 1A may notify the control room and monitoring staff or the like of the sensing result using the monitor 4, an LED, and/or a buzzer or the like. Specifically, the state diagnosis apparatus 1A may notify the control room and monitoring staff or the like of the sensing result by communication.

The state diagnosis apparatuses 1A to 1E and the state diagnosis systems 100A and 100B according to the first to the seventh embodiments have been explained above. The following is an explanation of other modifications of the state diagnosis apparatuses 1A to 1E and the state diagnosis systems 100A and 100B according to the embodiments.

Other Modifications

Each of the state diagnosis apparatuses 1A to 1E may notify the control room and the monitoring staff or the like of an alert, when the state diagnosis apparatus determines that the state numerical value output from the state diagnosis model 31 exceeds a predetermined value. In this operation, the alert may include the name of the device serving as the diagnosis target with the model, the date and time when the state numerical value exceeded the predetermined value, and a warning message to promote replacement or maintenance of the device.

In addition, when signal data indicating a plurality of deterioration types (also referred to as "deterioration modes") relating to the device is generated in a device, each of the state diagnosis apparatuses 1A to 1E may apply the state diagnosis model 31 to each of pieces of signal data corresponding to the respective deterioration types. As described above, a device may include a plurality of types of signal data generated in relation to acceleration and/or vibration of the device and the image and/or moving images output from the device. Each of the state diagnosis apparatuses 1A to 1E may apply the state diagnosis model 31 to each of the types of signal data. As a matter of course, each of the state diagnosis apparatuses 1A to 1E may determine validity of the state diagnosis model 31 by determining whether or not the state numerical values quantitatively indicating the signal data monotonously change.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A state diagnosis apparatus comprising a processing circuit configured to:
   execute a machine learning model receiving, as an input, first data relating to a state of a device at each of a plurality of successive points in time along a time series and outputting a first numerical value quantitatively indicating the first data for each of the plurality of successive points in time; and
   determine whether or not first numerical values output from the machine learning model monotonously change along the time series.

2. The apparatus according to claim 1, wherein
   the processing circuit transmits at least one of the model and the first numerical values output from the model, when the first numerical values output from the model monotonously change along the time series.

3. The apparatus according to claim 1, wherein
   the processing circuit trains the model using second data relating to the state of the device as training data.

4. The apparatus according to claim 3, wherein
   the processing circuit changes at least one of the training data and a parameter of the model and trains the model, when the first numerical values output from the model do not monotonously change along the time series.

5. A state diagnosis apparatus comprising
   a processing circuit configured to:
   execute a machine learning model receiving, as an input, first data relating to a state of a device at each of a plurality of successive points in time along a time series and outputting a plurality of first numerical values quantitatively indicating the first data for each of the plurality of successive points in time;
   calculate a variance and an average of the first numerical values output from the machine learning model for each of the plurality of successive points in time; and
   determine whether or not calculated variances have a predetermined value or less along the time series and whether or not calculated averages monotonously change along the time series.

6. The apparatus according to claim 5, wherein
   the processing circuit transmits at least one of the model and the first numerical values output from the model, when the calculated variances have the predetermined value or less along the time series and that the calculated averages monotonously change along the time series.

7. The apparatus according to claim 6, wherein
   the processing circuit trains the model using second data relating to the state of the device as training data.

8. The apparatus according to claim 7, wherein
   the processing circuit changes at least one of the training data and a parameter of the model and trains the model, in at least one of the case where the calculated variances do not have the predetermined value or less along the time series and the case where the calculated averages do not monotonously change along the time series.

9. The apparatus according to claim 1, wherein
   the processing circuit generates the first data on the basis of third data relating to the state of the device at a predetermined point in time along the time series and fourth data indicating a difference from the third data.

10. The apparatus according to claim 1, wherein
    the first data is signal data relating to sound of the device at each of the plurality of successive points in time along the time series.

11. The apparatus according to claim 1, wherein
    the first data is real data or pseudo data.

12. A state diagnosis system comprising a state diagnosis apparatus, a first device, and a second device,
    the state diagnosis apparatus including
    a processing circuit configured to:
    execute a machine learning model receiving, as an input, first data relating to a state of a device at each of a plurality of successive points in time along a time series and outputting a first numerical value quantitatively indicating the first data for each of the plurality of successive points in time;
    determine whether or not first numerical values output from the machine learning model monotonously change along the time series; and
    transmit the machine learning model to the second device when the first numerical values output from the machine learning model monotonously change along the time series,
    the second device receiving, as an input, second data and executing the machine learning model transmitted from the state diagnosis apparatus, the second data acquired from the first device, different from the first data, and relating to the state of the first device at each of the plurality of successive points in time along the time series.

13. The system according to claim 12, further comprising
    a third device displaying a plurality of second numerical values output from the model in the second device and quantitatively indicating the second data.

* * * * *